United States Patent
Masuda et al.

(10) Patent No.: US 12,392,954 B2
(45) Date of Patent: Aug. 19, 2025

(54) ILLUMINATION DEVICE INCLUDING THIRD PRISM SHEET AND DISPLAY DEVICE INCLUDING THE SAME

(71) Applicant: Sharp Display Technology Corporation, Kameyama (JP)

(72) Inventors: Junichi Masuda, Kameyama (JP); Shugo Yagi, Kameyama (JP); Satoshi Tsubooka, Kameyama (JP); Yuuichi Kanbayashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/799,089

(22) Filed: Aug. 9, 2024

(65) Prior Publication Data

US 2025/0076562 A1    Mar. 6, 2025

(30) Foreign Application Priority Data

Sep. 1, 2023 (JP) .................................. 2023-142029

(51) Int. Cl.
*F21V 8/00* (2006.01)
*G02F 1/1335* (2006.01)
*G02F 1/13357* (2006.01)

(52) U.S. Cl.
CPC ........... *G02B 6/0053* (2013.01); *G02B 6/002* (2013.01); *G02B 6/0055* (2013.01); *G02B 6/0073* (2013.01); *G02B 6/0088* (2013.01); *G02F 1/133524* (2013.01); *G02F 1/133615* (2013.01)

(58) Field of Classification Search
CPC .. G02B 6/002; G02B 6/0053; G02F 1/133615
See application file for complete search history.

(56) References Cited

U.S. PATENT DOCUMENTS

| | | | |
|---|---|---|---|
| 2016/0054507 A1* | 2/2016 | Hirayama | G02B 6/0091 362/607 |
| 2020/0233145 A1* | 7/2020 | Yagi | G02B 6/0036 |
| 2021/0011212 A1* | 1/2021 | Hsu | G02B 6/0053 |
| 2024/0385363 A1* | 11/2024 | Weng | G02B 6/0051 |

FOREIGN PATENT DOCUMENTS

| | | | | |
|---|---|---|---|---|
| JP | 3755778 B2 | 3/2006 | | |
| WO | WO-2016104976 A1 * | 6/2016 | ............. | B29C 55/02 |

\* cited by examiner

*Primary Examiner* — Keith G. Delahoussaye
(74) *Attorney, Agent, or Firm* — ScienBiziP, P.C.

(57) ABSTRACT

An illumination device that includes a light source, a light guide plate featuring a first end face, a first main surface, a second main surface, and a first prism sheet is provided. The first prism sheet includes a third main surface, facing the second main surface of the light guide plate, and a fourth main surface. The second main surface of the light guide plate is provided with a first inclined surface that has an inclination rising from a side opposite the light source side toward the light source side in a first direction. The fourth main surface of the first prism sheet is provided with multiple first prisms extending along the first direction and disposed along a second direction. Each first prism includes a first base parallel to the second direction, and a pair of first oblique sides rising from both ends of the first base.

8 Claims, 16 Drawing Sheets

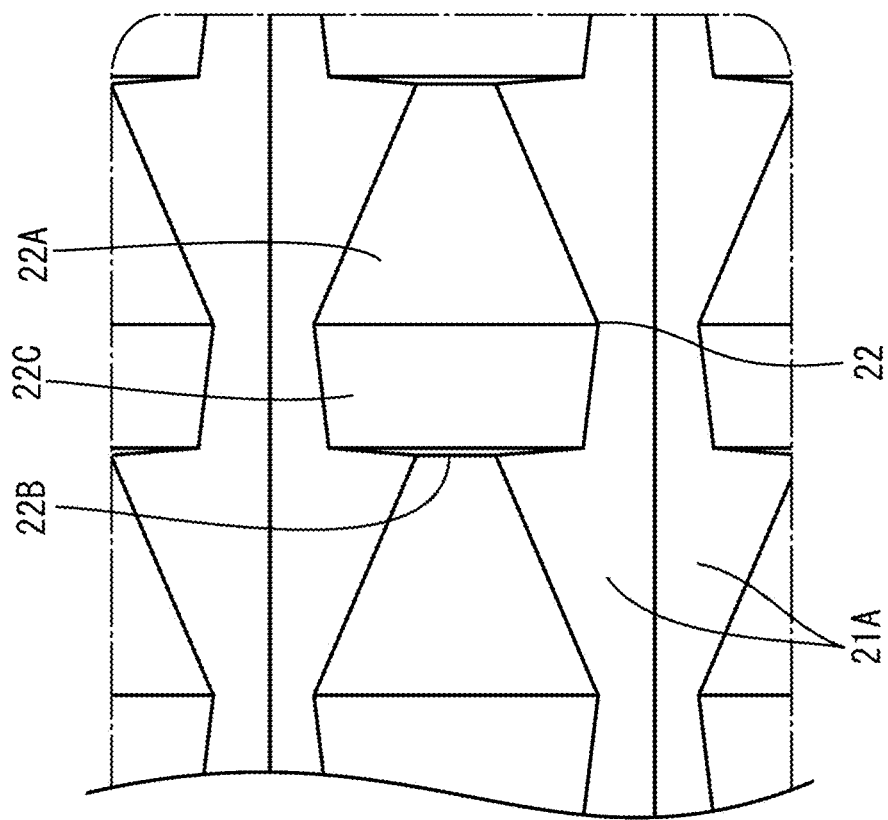
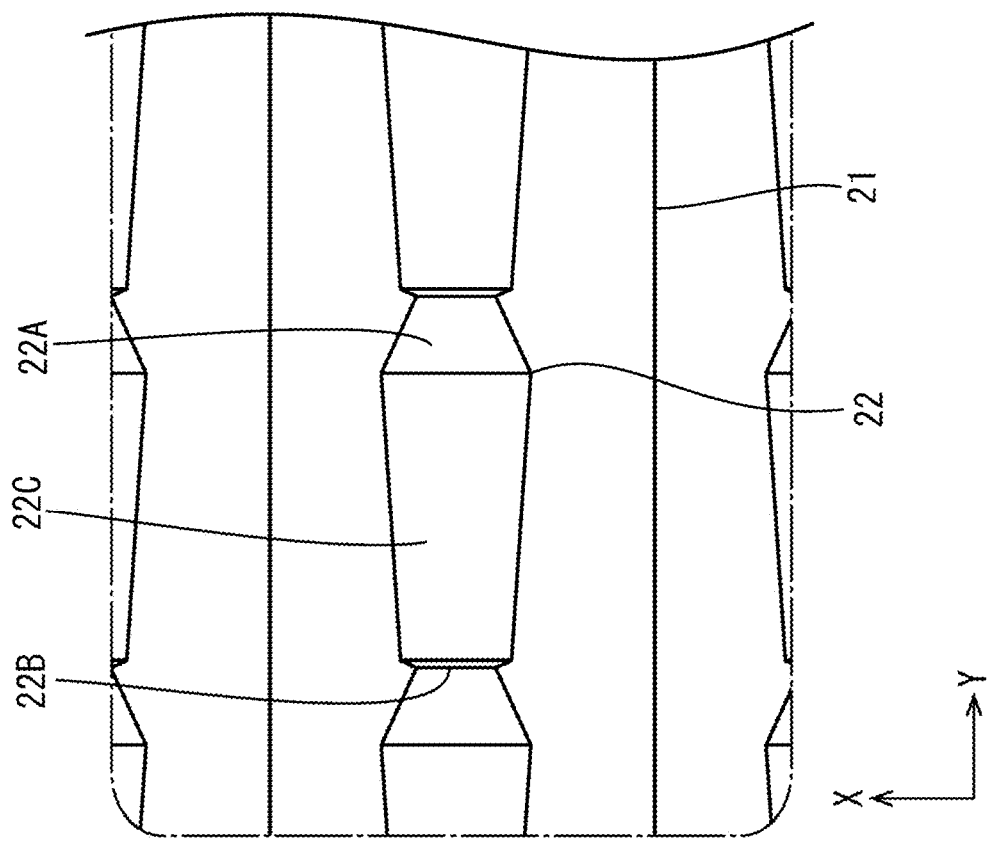
FIG. 5

|  | EXAMPLE 1 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| PEAK ANGLE | +6° | +3° | +3° | +8° | +3° |
| BACKLIGHT TYPE | A | B | B | A | B |
| LOUVER | NONE | YES | NONE | NONE | NONE |
| FIRST PRISM SHEET | YES | NONE | NONE | NONE | YES |
| LIGHT ABSORPTION SHEET | YES | NONE | NONE | NONE | NONE |
| LIGHT REFLECTIVE SHEET | NONE | YES | YES | YES | YES |
| RELATIVE LUMINANCE +50° | 1.3% | 2.8% | 29.2% | 3.3% | 30.1% |
| RELATIVE LUMINANCE +60° | 2.0% | 1.9% | 31.2% | 3.9% | 32.6% |
| RELATIVE LUMINANCE +70° | 2.2% | 1.1% | 26.0% | 5.0% | 27.0% |
| RELATIVE LUMINANCE +80° | 1.4% | 0.9% | 16.1% | 4.0% | 16.8% |

FIG. 9

|  | EXAMPLE 1 | EXAMPLE 2 | COMPARATIVE EXAMPLE 3 |
|---|---|---|---|
| PEAK ANGLE | +6° | +9° | +8° |
| BACKLIGHT TYPE | A | A | A |
| LOUVER | NONE | NONE | NONE |
| FIRST PRISM SHEET | YES | YES | NONE |
| LIGHT ABSORPTION SHEET | YES | NONE | NONE |
| LIGHT REFLECTIVE SHEET | NONE | YES | YES |
| RELATIVE LUMINANCE +50° | 1.3% | 2.4% | 3.3% |
| RELATIVE LUMINANCE +60° | 2.0% | 3.3% | 3.9% |
| RELATIVE LUMINANCE +70° | 2.2% | 3.6% | 5.0% |
| RELATIVE LUMINANCE +80° | 1.4% | 2.1% | 4.0% |

FIG. 12

|  | EXAMPLE 1 | EXAMPLE 2 | EXAMPLE 3 | COMPARATIVE EXAMPLE 1 |
|---|---|---|---|---|
| PEAK ANGLE | +6° | +9° | +4° | +3° |
| BACKLIGHT TYPE | A | A | A | B |
| LOUVER | NONE | NONE | NONE | YES |
| FIRST PRISM SHEET | YES | YES | YES | NONE |
| LIGHT ABSORPTION SHEET | YES | NONE | YES | NONE |
| LIGHT REFLECTIVE SHEET | NONE | YES | NONE | YES |
| RELATIVE LUMINANCE +50° | 1.3% | 2.4% | 1.9% | 2.8% |
| RELATIVE LUMINANCE +60° | 2.0% | 3.3% | 2.8% | 1.9% |
| RELATIVE LUMINANCE +70° | 2.2% | 3.6% | 2.9% | 1.1% |
| RELATIVE LUMINANCE +80° | 1.4% | 2.1% | 1.7% | 0.9% |

FIG. 16

ILLUMINATION DEVICE INCLUDING THIRD PRISM SHEET AND DISPLAY DEVICE INCLUDING THE SAME

CROSS-REFERENCE TO RELATED APPLICATIONS

This application claims the benefit of priority to Japanese Patent Application Number 2023-142029 filed on Sep. 1, 2023. The entire contents of the above-identified application are hereby incorporated by reference.

BACKGROUND

Technical Field

The techniques disclosed in the present specification relate to illumination devices and display devices.

In the related art, an illumination device disclosed in JP 3755778 B is known as an example. JP 3755778 B describes the illumination device used for a vehicle instrument. The vehicle instrument disclosed in JP 3755778 B is disposed below a windshield, covers a front side of a dial on which a display portion indicated by a pointer is formed is covered with a front cover, and indirectly illuminates the display portion and an indicator of the pointer by turning on a light source. In this vehicle instrument, an anti-reflection film is formed on the surface of the front cover to omit a hood above the front cover, and a louver for regulating an emission angle so that emission light is not directed toward the windshield side is formed on each of an upper face of the indicator of the pointer and a white diffusion layer facing a display slit formed in a black non-transmissive layer in accordance with the display portion of the dial.

SUMMARY

In a vehicle instrument disclosed in JP 3755778 B, a louver prevents occurrence of a phenomenon in which external light from the outside of a vehicle is reflected to a driver side and reflection of a light emitting display on a windshield. However, since such a louver has a high component price, there has been a demand for regulating an emission angle of light and preventing occurrence of reflection on the windshield without using the louver.

The techniques described herein have been made based on the circumstances described above, and an object thereof is to regulate an emission angle of light without using a louver.

(1) An illumination device described in the present specification includes a light source, a light guide plate including a first end face that is at least some of outer peripheral end faces of the light guide plate and faces the light source and on which light is incident, a first main surface that is one main surface of the light guide plate, and a second main surface that is the other main surface of the light guide plate, and a first prism sheet including a third main surface that is one main surface of the first prism sheet and disposed to face the second main surface and a fourth main surface that is the other main surface of the first prism sheet, in which the second main surface of the light guide plate is provided with a first inclined surface that is an inclination rising from a side opposite to the light source side toward the light source side in a first direction including a direction from the light source toward the light guide plate, the fourth main surface of the first prism sheet is provided with a plurality of first prisms extending along the first direction and arranged along a second direction intersecting the first direction and along the fourth main surface, and the first prism includes a first base parallel to the second direction and a pair of first oblique sides rising from both ends of the first base.

(2) In addition to (1) described above, the illumination device may further include a light absorption sheet including a fifth main surface that is one main surface of the light absorption sheet and disposed to face the fourth main surface and having light absorbability higher than any of the light guide plate and the first prism sheet.

(3) In addition to (1) described above, the illumination device may further include a light reflective sheet including a sixth main surface that is one main surface of the light reflective sheet and disposed to face the fourth main surface and having light reflectivity higher than any of the light guide plate and the first prism sheet.

(4) In addition to any one of (1) to (3) described above, the illumination device may further include a second prism sheet including a seventh main surface that is one main surface of the second prism sheet and an eighth main surface that is the other main surface of the second prism sheet and disposed to face the first main surface, and a third prism sheet including a ninth main surface that is one main surface of the third prism sheet and a tenth main surface that is the other main surface of the third prism sheet and disposed to face the seventh main surface, in which the seventh main surface of the second prism sheet may be provided with a plurality of second prisms extending along the second direction and disposed side by side along the first direction, and the ninth main surface of the third prism sheet may be provided with a plurality of third prisms extending along the second direction and disposed side by side along the first direction.

(5) In addition to (4) described above, in the illumination device, the second prism may include a second base parallel to the first direction and a pair of second oblique sides rising from both ends of the second base, and among the pair of second oblique sides, the second oblique side on the side of the light source in the first direction may form a larger angle with respect to the second base than the second oblique side opposite to the light source side in the first direction.

(6) In addition to (4) or (5) described above, in the illumination device, the third prism may include a third base parallel to the first direction and a pair of third oblique sides rising from both ends of the third base, and angles between the pair of third oblique sides and the third base are the same angle.

(7) In addition to any one of (1) to (6) described above, in the illumination device, the first inclined surface includes a plurality of the first inclined surfaces, the plurality of first inclined surfaces are disposed side by side along the first direction, and the plurality of first inclined surfaces increase in area while getting farther from the light source.

(8) A display device according to the techniques described in the present specification includes the illumination device according to any of (1) to (7) described above, and a display panel configured to perform display by using light from the illumination device.

According to the techniques described herein, an emission angle of light can be regulated without using a louver.

BRIEF DESCRIPTION OF DRAWINGS

The disclosure will be described with reference to the accompanying drawings, wherein like numbers reference like elements.

FIG. 5 is a bottom view illustrating a configuration of the second main surface of the light guide plate according to the first embodiment.

FIG. 9 is a table showing experimental results of Comparative Experiment 2 according to the first embodiment.

FIG. 12 is a table showing experimental results of Comparative Experiment 4 according to the second embodiment.

FIG. 16 is a table showing experimental results of Comparative Experiment 7 according to the third embodiment.

DESCRIPTION OF EMBODIMENTS

First Embodiment

The first embodiment will be described with reference to FIGS. 1 to 9. In the present embodiment, a liquid crystal display device (display device) 10 is exemplified. Note that some drawings show an X-axis, a Y-axis, and a Z-axis, and directions of these axes are drawn so as to be common in all the drawings. Furthermore, a vertical direction is based on the vertical direction of FIGS. 2, 3, and 7, an upper side in the same drawings is referred to as a front side, and a lower side in the same drawings is referred to as a back side.

Figure 1:
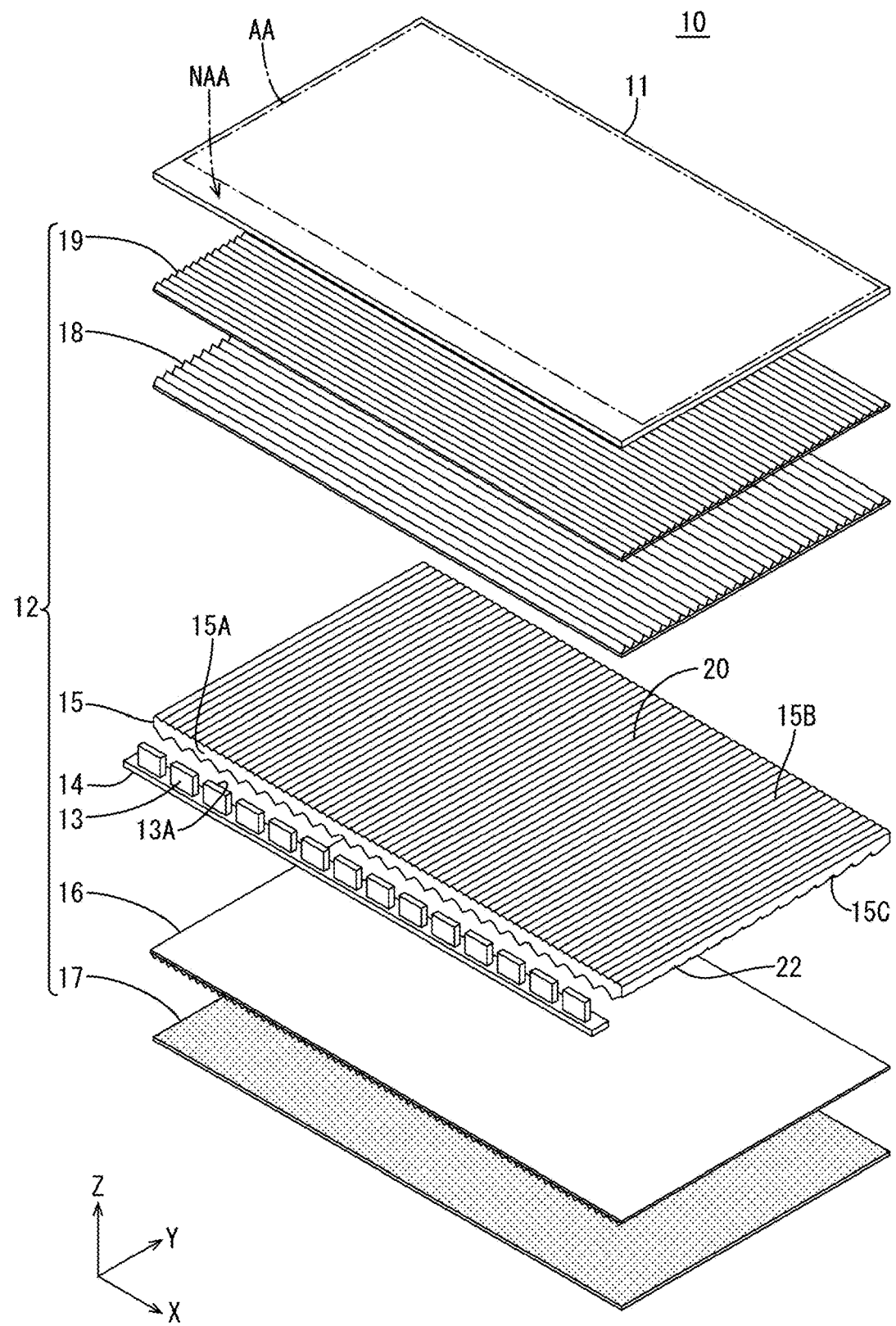
FIG. 1 is an exploded perspective view of a liquid crystal display device according to a first embodiment.

As illustrated in FIG. 1, the liquid crystal display device 10 includes a liquid crystal panel (display panel) 11 that displays an image, and a backlight device (illumination device) 12 that is disposed on the back side of the liquid crystal panel 11 and irradiates the liquid crystal panel 11 with light to be used for display. In the present embodiment, the liquid crystal display device 10 for vehicle application is exemplified. For example, the liquid crystal display device 10 for vehicle application is mounted on a car navigation system displaying a map and the like as an image, a multi-function display displaying an operation situation and the like of equipment such as an air conditioner in addition to a map and the like as an image, an instrument panel displaying gauges, alerts, and the like as an image, and an infotainment system displaying television images, audio information, and the like in addition to a map and the like as an image.

The liquid crystal panel 11 has a horizontally elongated rectangular plate shape as a whole. A long-side direction, a short-side direction, and a plate-thickness direction (normal direction of a main surface) of the liquid crystal panel 11 coincide with an X-axis direction, a Y-axis direction, and a Z-axis direction, respectively. In the liquid crystal panel 11, a center side portion of the main surface is a display region AA that can display an image, and an outer circumferential end side portion surrounding the display region AA and having a frame shape is a non-display region NAA. The liquid crystal panel 11 includes a pair of substrates and a liquid crystal layer sealed between the pair of substrates. Among the pair of substrates constituting the liquid crystal panel 11, the one disposed on the front side is a CF substrate (counter substrate), and the one disposed on the back side is an array substrate (TFT substrate). Color filters that exhibit red (R), green (G), blue (B), and the like, a light blocking portion (black matrix) that partitions adjacent color filters, and the like are provided on the CF substrate. The array substrate (TFT substrate) is provided with at least a gate wiring line and a source wiring line that are orthogonal to each other, a switching element (for example, a TFT) connected to the gate wiring line and the source wiring line, and a pixel electrode connected to the switching element and constituting a pixel. Further, an alignment film is provided on each inner surface of the array substrate and the CF substrate constituting the liquid crystal panel 11. Furthermore, a polarizer is attached to each outer surface of the array substrate and the CF substrate constituting the liquid crystal panel 11.

Next, the backlight device 12 will be described. As illustrated in FIG. 1, the backlight device 12 includes at least an LED 13 as a light source, an LED substrate (light source substrate) 14 on which the LED 13 is mounted, a light guide plate 15 that guides light from the LED 13, a first prism sheet 16 disposed on the back side (side opposite to a light emission side) of the light guide plate 15, a light absorption sheet 17 disposed on the back side of the first prism sheet 16, a second prism sheet 18 disposed on the front side (light emission side) of the light guide plate 15, and a third prism sheet 19 disposed on the front side of the second prism sheet 18. Among them, the first prism sheet 16 and the light absorption sheet 17 will be described later, and the other configurations (the LED 13, the LED substrate 14, the second prism sheet 18, and the third prism sheet 19) will be sequentially described. The backlight device 12 according to the present embodiment is an edge light type of a one-side light entering type in which light of the LED 13 is incident on the light guide plate 15 only from one side.

As illustrated in FIG. 1, the LED 13 is configured such that an LED chip is sealed with a sealing material on a substrate portion affixed to the LED substrate 14. The LED 13 is configured such that the LED chip emits, for example, blue light in a single light, and a phosphor is dispersed and mixed in the sealing material to emit white light as a whole. Examples of the phosphor include yellow phosphor, green phosphor, and red phosphor. The LED 13 is a so-called side light emitting type in which a side face thereof adjacent to a mounting face of the LED substrate 14 is a light-emitting face 13A. The LED substrate 14 is disposed in an orientation in which a main surface of the LED substrate 14 is parallel to a main surface of the light guide plate 15, and the main surface of the LED substrate 14 on the front side is a mounting face for the LED 13. A plurality of LEDs 13 are disposed side by side at substantially equal intervals along the X-axis direction on the mounting face of the LED substrate 14. The arrangement direction of the plurality of LEDs 13 coincides with the X-axis direction.

The light guide plate 15 is made of a synthetic resin material that has a sufficiently higher refractive index than that of the air and that is substantially transparent.

Specifically, the light guide plate 15 is made of, for example, an acrylic resin such as PMMA as the synthetic resin material, and has the refractive index of, for example, about 1.49. As illustrated in FIG. 1, the light guide plate 15 has a plate shape, and the main surface of the light guide plate 15 is parallel to a main surface of the liquid crystal panel 11. Note that the light guide plate 15 is configured such that a long-side direction of the main surface, a short-side direction of the main surface, and a plate-thickness direction that is the normal direction of the main surface coincide with the X-axis direction (second direction), the Y-axis direction (first direction), and the Z-axis direction (third direction), respectively. The light guide plate 15 is disposed immediately below the liquid crystal panel 11. Among outer peripheral end faces of the light guide plate 15, an end face on the side of one long side is a light incident end face (first end face) 15A which faces the light-emitting faces 13A of the LEDs 13 and on which light from the light-emitting faces 13A is directly incident. A long-side direction and a short-side direction of the light incident end face 15A coincide with the X-axis direction and the Z-axis direction, respectively. Among a pair of main surfaces of the light guide plate 15, the main surface on the front side facing the liquid crystal panel 11 is a first main surface 15B that emits light guided therein, and the main surface on the back side facing the light absorption sheet 17 is a second main surface 15C. The light guide plate 15 has a function of introducing light emitted from the LED 13 toward the light guide plate 15 from the light incident end face 15A, propagating the light therein, and then, emitting the light toward the front side (light emission side) from the first main surface 15B. A detailed structure of the light guide plate 15 will be described later. Note that the normal direction of the light incident end face 15A coincides with the Y-axis direction (first direction) including a direction from the LEDs 13 toward the light guide plate 15.

As illustrated in FIG. 1, the second prism sheet 18 and the third prism sheet 19 have a sheet shape, and respective main surfaces thereof are parallel to the respective main surfaces of the liquid crystal panel 11 and the light guide plate 15. Note that the respective main surfaces of the second prism sheet 18 and the third prism sheet 19 are parallel to the X-axis direction and the Y-axis direction, and a normal direction (thickness direction) of the main surfaces coincides with the Z-axis direction. The second prism sheet 18 and the third prism sheet 19 are layered on the front side of the light guide plate 15, and have a function of imparting a predetermined optical action to light emitted from the first main surface 15B of the light guide plate 15 to emit the light, and the like.

Figure 2:
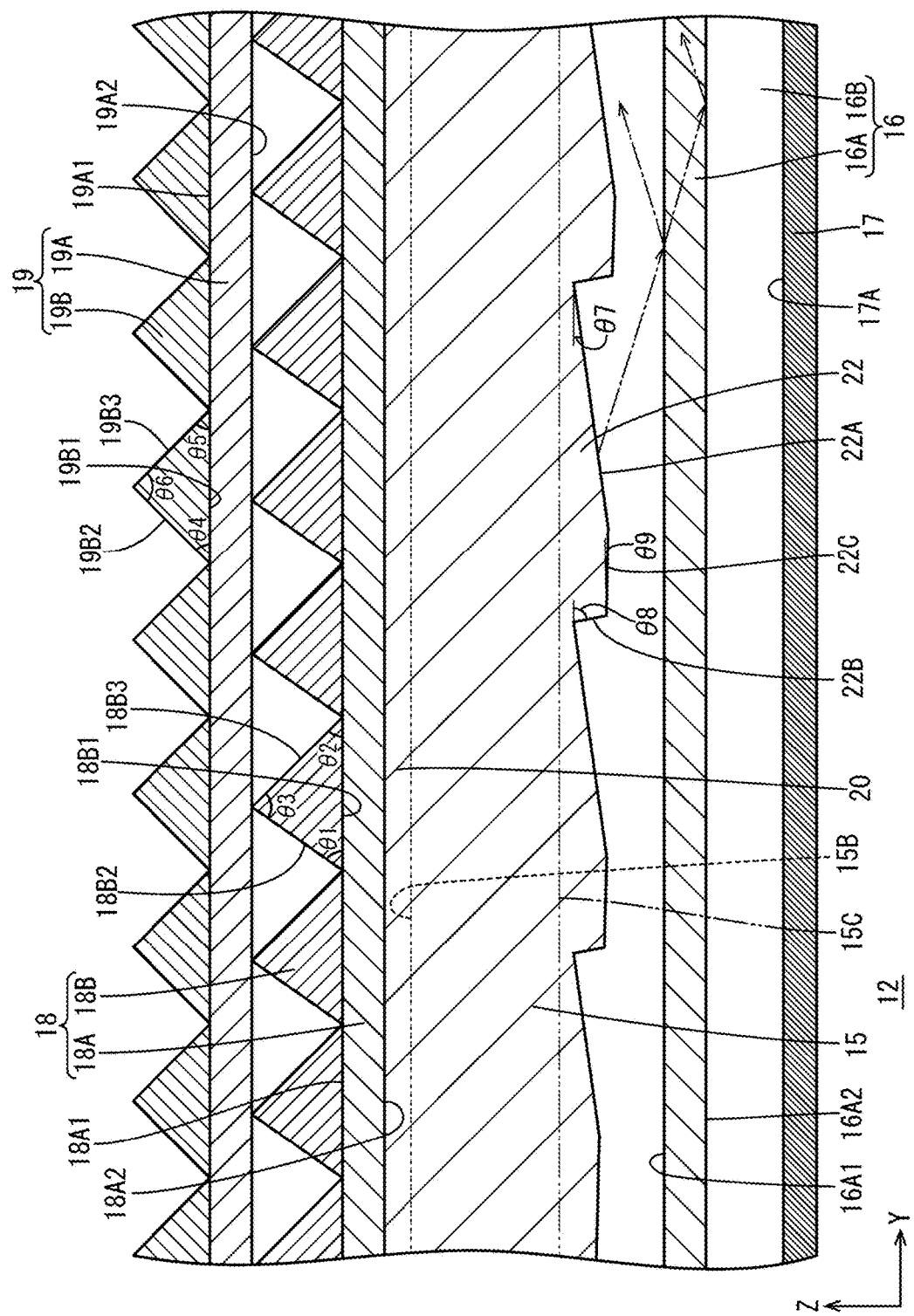
FIG. 2 is a cross-sectional view of a backlight device constituting the liquid crystal display device according to the first embodiment taken along a Y-axis direction.

As illustrated in FIG. 1 and FIG. 2, the second prism sheet 18 includes a second base material 18A having a sheet shape and second prisms 18B provided on the second base material 18A. A pair of main surfaces of the second base material 18A include a second light emission main surface (seventh main surface) 18A1 and a second light incident main surface (eighth main surface) 18A2. The second light emission main surface 18A1 is a main surface of the second base material 18A on the front side (light emission side) facing the third prism sheet 19, and emits light toward the third prism sheet 19. The second light incident main surface 18A2 is a main surface of the second base material 18A on the back side (side opposite to the light emission side) facing the first main surface 15B of the light guide plate 15, and light emitted from the first main surface 15B is incident on the second light incident main surface 18A2.

The second base material 18A is made of substantially transparent synthetic resin, and specifically, is formed of, for example, a crystalline transparent resin material such as polyethylene terephthalate (PET). The second base material 18A is formed into a sheet shape by stretching the crystalline transparent resin material serving as a raw material in a biaxially stretching process in manufacturing, which is suitable for reducing manufacturing costs. The second prism 18B is formed of an ultraviolet-curing resin material being substantially transparent and being a type of photo-curable resin material. In manufacturing the second prism sheet 18, for example, the uncured ultraviolet-curing resin material is filled into a mold for molding, and the second base material 18A is applied to an opening end of the mold to dispose the uncured ultraviolet-curing resin material so as to contact the main surface on the front side, and in this state, when the ultraviolet-curing resin material is irradiated with ultraviolet rays through the second base material 18A, the ultraviolet-curing resin material is cured, and the second prism 18B is integrally provided with the second base material 18A. The ultraviolet-curing resin material constituting the second prism 18B is, for example, an acrylic resin such as PMMA. A refractive index of the ultraviolet-curing resin material constituting the second prism 18B is preferably set within a range from 1.49 to 1.52, and is most preferably set to 1.49.

As illustrated in FIG. 2, the second prism 18B is provided on the second light emission main surface 18A1 on the front side of the second base material 18A. Specifically, the second prism 18B is provided so as to protrude from the second light emission main surface 18A1 of the second base material 18A toward the front side (side opposite to the light guide plate 15 side) along the Z-axis direction. The second prism 18B has a substantially triangular shape (is substantially mountain shaped) in a cross section taken along the Y-axis direction and extends linearly along the X-axis direction (second direction), and a plurality of the second prisms 18B are disposed side by side along the Y-axis direction (first direction) on the second light emission main surface 18A1 of the second base material 18A. The plurality of second prisms 18B are continuously arranged along the Y-axis direction with substantially no interval therebetween. The second prism 18B includes a second base 18B1 parallel to the Y-axis direction, and a pair of second oblique sides 18B2 and 18B3 rising from both ends of the second base 18B1. Among the pair of second oblique sides 18B2 and 18B3 of the second prism 18B, the oblique side located on the side of the LED 13 (left side in FIG. 2) in the Y-axis direction is referred to as a second LED-side oblique side (one of the second oblique side) 18B2, and the oblique side located on the side opposite to the LED 13 side (right side in FIG. 2) in the Y-axis direction is referred to as a second opposite-to-LED-side oblique side (the other of the second oblique side) 18B3. Among the pair of oblique sides, the second opposite-to-LED-side oblique side 18B3 is exposed mainly to light traveling in a direction (right side in FIG. 2) away from the LED 13 in the Y-axis direction out of light incident on the second prism 18B, refracting the light. On the other hand, the second LED-side oblique side 18B2 is exposed mainly to light traveling in a direction (left side in FIG. 2) approaching the LED 13 in the Y-axis direction out of the light incident on the second prism 18B, refracting the light. In any case, most of the light refracted by the pair of second oblique sides 18B2 and 18B3 of the second prism 18B is selectively raised in the Y-axis direction and condensed.

As illustrated in FIG. 2, in the second prism 18B, when an inclination angle (third bottom angle) $\theta1$ of the second LED-side oblique side 18B2 with respect to the second base 18B1, and an inclination angle (fourth bottom angle) $\theta2$ of the second opposite-to-LED-side oblique side 18B3 with respect to the second base 18B1 are compared, the former is set to be larger than the latter. That is, the second prism 18B has an asymmetric cross-sectional shape, which is that of a scalene triangle. Specifically, the inclination angle $\theta1$ of the second LED-side oblique side 18B2 with respect to the second base 18B1 in the second prism 18B is preferably within a range from 50° to 60°, and is most preferably set to 55°. On the other hand, the inclination angle $\theta2$ of the second opposite-to-LED-side oblique side 18B3 with respect to the second base 18B1 in the second prism 18B is preferably within a range from 35° to 50°, and is most preferably set to 45°. Further, an angle (second apex angle) $\theta3$ formed by the pair of second oblique sides 18B2 and 18B3 of the second prism 18B is preferably set within a range from 70° to 95°, and is most preferably set to 80°. Note that all the plurality of second prisms 18B arranged along the X-axis direction have substantially the same height dimension, substantially the same width dimension for the second base 18B1, substantially the same inclination angles for the second oblique sides 18B2 and 18B3 with respect to the second base 18B1, and the like, and are arranged such that the arrangement intervals between adjacent second prisms 18B are substantially constant and equal.

As illustrated in FIG. 1 and FIG. 2, the third prism sheet 19 includes a third base material 19A having a sheet shape and third prisms 19B provided on the third base material 19A. A pair of main surfaces of the third base material 19A includes a third light emission main surface (ninth main surface) 19A1 and a third light incident main surface (tenth main surface) 19A2. The third light emission main surface 19A1 is a main surface of the third base material 19A on the front side and emits light toward the outside. The third light incident main surface 19A2 is a main surface of the third base material 19A on the back side facing the second prism sheet 18, and light emitted from the second prism sheet 18 is incident on the third light incident main surface 19A2.

The third base material 19A is made of substantially transparent synthetic resin, and is specifically formed of, for example, a crystalline transparent resin material such as PET that is the same as the second base material 18A. The third prism 19B is formed of an ultraviolet-curing resin material being substantially transparent and being a type of photo-curable resin material. A manufacturing method of the third prism sheet 19 is similar to the manufacturing method of the second prism sheet 18 described above. The ultraviolet-curing resin material constituting the third prism 19B is, for example, an acrylic resin such as PMMA, and a refractive index of the ultraviolet-curing resin material is set higher than the refractive index of the material of the second prism 18B, and is set to, for example, approximately 1.61.

As illustrated in FIG. 2, the third prism 19B is provided on the third light emission main surface 19A1 on the front side of the third base material 19A. Specifically, the third prism 19B is provided so as to protrude from the third light emission main surface 19A1 of the third base material 19A toward the front side (side opposite to the second prism sheet 18 side) along the Z-axis direction. The third prism 19B has a substantially triangular shape (is substantially mountain shaped) in a cross section taken along the Y-axis direction and extends linearly along the X-axis direction (second direction), and a plurality of the third prisms 19B are disposed side by side along the Y-axis direction (first direction) on the third light emission main surface 19A1 of the third base material 19A. The plurality of third prisms 19B are continuously arranged along the Y-axis direction with substantially no interval therebetween. The third prism 19B includes a third base 19B1 parallel to the Y-axis direction, and a pair of third oblique sides 19B2 and 19B3 rising from both ends of the third base 19B1. Among the pair of third oblique sides 19B2 and 19B3 of the third prism 19B, the oblique side located on the side of the LED 13 (left side in FIG. 2) in the Y-axis direction is referred to as a third LED-side oblique side (one of the third oblique side) 19B2, and the oblique side located on the side opposite to the LED 13 side (right side in FIG. 2) in the Y-axis direction is referred to as a third opposite-to-LED-side oblique side (the other of the third oblique side) 19B3. Among the pair of oblique sides, the third opposite-to-LED-side oblique side 19B3 is exposed mainly to light traveling in a direction (right side in FIG. 2) away from the LED 13 in the Y-axis direction out of light incident on the third prism 19B, refracting the light. On the other hand, the third LED-side oblique side 19B2 is exposed mainly to light traveling in a direction (left side in FIG. 2) approaching the LED 13 in the Y-axis direction out of the light incident on the third prism 19B, refracting the light. In any case, most of the light refracted by the pair of third oblique sides 19B2 and 19B3 of the third prism 19B is selectively raised in the Y-axis direction and condensed.

As illustrated in FIG. 2, in the third prism 19B, an inclination angle (fifth bottom angle) $\theta4$ of the third LED-side oblique side 19B2 with respect to the third base 19B1 and an inclination angle (sixth bottom angle) $\theta5$ of the third opposite-to-LED-side oblique side 19B3 with respect to the third base 19B1 are identical. That is, the third prism 19B has a symmetric cross-sectional shape, which is that of an isosceles triangle. Moreover, the inclination angle $\theta4$ of the third LED-side oblique side 19B2 with respect to the third base 19B1 in the third prism 19B is made smaller than the inclination angle $\theta1$ of the second LED-side oblique side 18B2 with respect to the second base 18B1 in the second prism 18B provided on the second prism sheet 18. Specifically, the respective inclination angles $\theta4$ and $\theta5$ of the pair of third oblique sides 19B2 and 19B3 with respect to the third base 19B1 in the third prism 19B are preferably within a range from 40° to 50°, and are most preferably set to 45°. On the other hand, an angle (third apex angle) $\theta6$ formed by the pair of third oblique sides 19B2 and 19B3 of the third prism 19B is preferably set within a range from 80° to 100°, and is most preferably set to 90°, that is, a right angle. Note that all the plurality of third prisms 19B arranged along the X-axis direction have substantially the same height dimension, substantially the same width dimension for the third base 19B1, substantially the same inclination angles for the third oblique sides 19B2 and 19B3 with respect to the third base 19B1, and the like, and are arranged such that the arrangement intervals between adjacent third prisms 19B are substantially constant and equal. In addition, the height dimension and the arrangement intervals of the third prisms 19B preferably differ from the height dimension and the arrangement intervals of the second prism 18B, respectively, in terms of suppressing the occurrence of interference fringes called moire.

The actions and effects of the second prism sheet 18 and the third prism sheet 19 having the configurations described above will be described. Light emitted from the LED 13 and incident on the light incident end face 15A of the light guide plate 15 is propagated inside the light guide plate 15, emitted from the first main surface 15B, and incident on the second prism sheet 18. Most of the light incident on the second prism sheet 18 is incident on and refracted by the second opposite-to-LED-side oblique side 18B3 that is the oblique side located on the side opposite to the LED 13 side in the Y-axis direction among the pair of second oblique sides 18B2 and 18B3 of the second prism 18B, and then is raised and emitted, or is directed toward the second LED-side oblique side 18B2 that is the oblique side located on the side of the LED 13 side in the Y-axis direction. As described above, in the second prism 18B, the inclination angle θ1 formed by the second LED-side oblique side 18B2 that is the oblique side located on the side of the LED 13 in the Y-axis direction with respect to the second base 18B1 is larger than the inclination angle θ2 formed by the second opposite-to-LED-side oblique side 18B3 that is the oblique side located on the side opposite to the LED 13 side in the Y-axis direction with respect to the second base 18B1. Thus, as compared with the case in which the inclination angles θ1 and θ2 are the same or the case in which the inclination angle θ2 is larger than the inclination angle θ1, the light incident on the second prism sheet 18 is less likely to be incident on the second LED-side oblique side 18B2 of the second prism 18B that is the oblique side located on the side of the LED 13. When the incident light incident on the second prism sheet 18 is incident on the second LED-side oblique side 18B2 of the second prism 18B that is the oblique side located on the side of the LED 13, the light is not raised when being emitted from the second prism 18B, and tends to be more likely to be emitted as side lobe light. Thus, when the incident light incident on the second prism sheet 18 becomes less likely to be directly incident on the second LED-side oblique side 18B2 of the second prism 18B that is the oblique side located on the side of the LED 13, the occurrence of side lobe light is suppressed, and as a result, the usage efficiency of light is improved.

Most of the light emitted from the second prism sheet 18 and incident on the third prism sheet 19 is incident on and refracted by the third opposite-to-LED-side oblique side 19B3 that is the oblique side located on the side opposite to the LED 13 side in the Y-axis direction among the pair of third oblique sides 19B2 and 19B3 of the third prism 19B, and then is raised and emitted, or is directed toward the third LED-side oblique side 19B2 that is the oblique side located on the side of the LED 13 in the Y-axis direction. As described above, in the third prism 19B, the respective inclination angles θ4 and θ5 formed by the pair of third oblique sides 19B2 and 19B3, with respect to the third base 19B1 are equal to each other. Thus, compared with the case in which the inclination angles θ4 and θ5 are different from each other, the light refracted by the third opposite-to-LED-side oblique side 19B3 that is the oblique side located on the side opposite to the LED 13 side in the Y-axis direction and directed toward the third LED-side oblique side 19B2 that is the oblique side located on the side of the LED 13 in the Y-axis direction is easily returned to the side of the second prism sheet 18 by the third LED-side oblique side 19B2 that is the oblique side located on the side of the LED 13 in the Y-axis direction. As a result, the amount of light returned from the third prism sheet 19 toward the second prism sheet 18 side (hereinafter referred to as recursive light) is increased. This recursive light reaches the third prism sheet 19 again by being reflected or the like inside the backlight device 12, and is raised and emitted by either of the pair of third oblique sides 19B2 and 19B3 of the third prism 19B, so the usage efficiency of light is improved.

Figure 3:
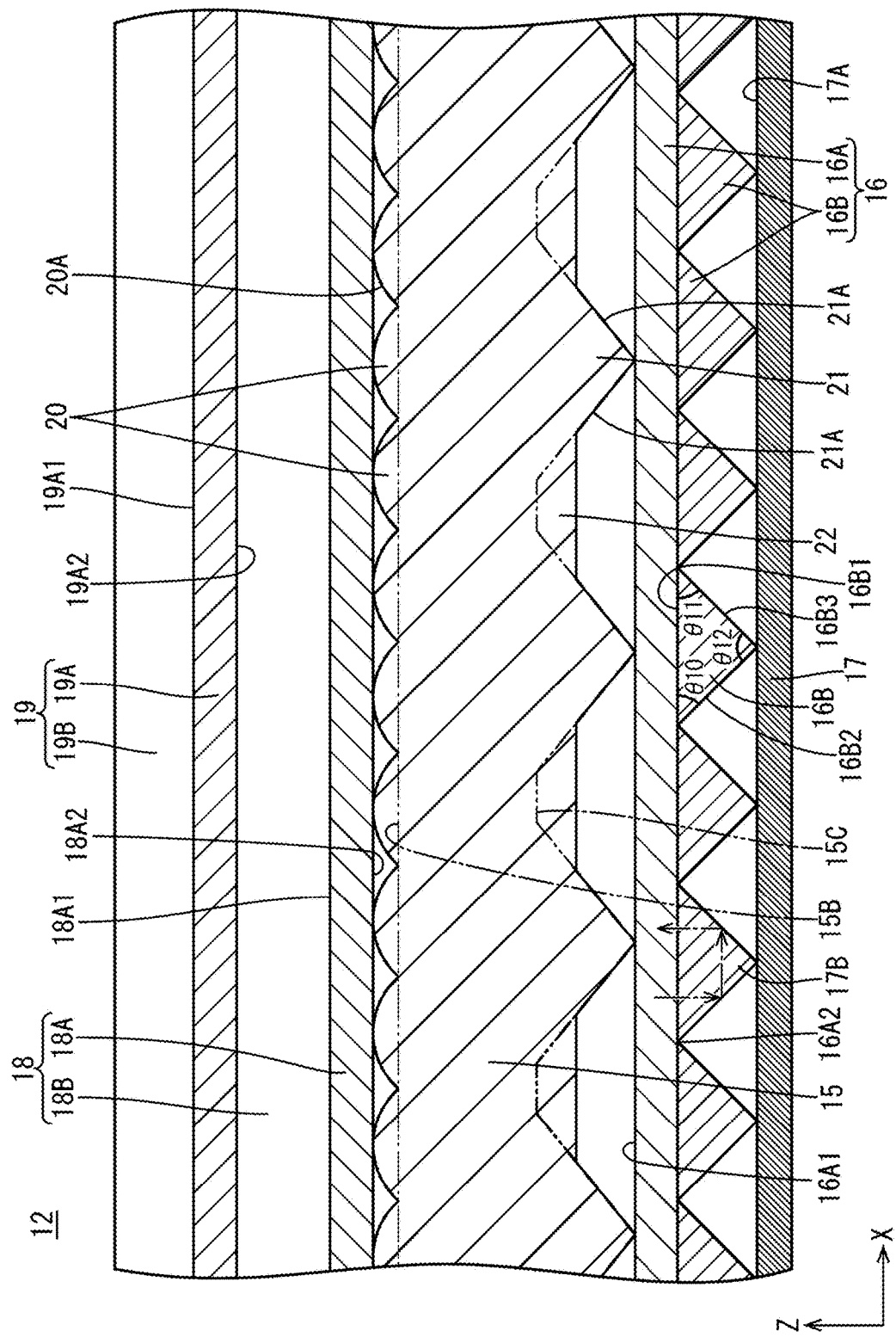
FIG. 3 is a cross-sectional view of a backlight device according to the first embodiment taken along an X-axis direction.

Here, a detailed structure of the light guide plate 15 will be described. As illustrated in FIGS. 2 and 3, a first light guide plate lens 20, a second light guide plate lens 21, and a third light guide plate lens (first lens) 22 are provided on the light guide plate 15.

As illustrated in FIG. 3, the first light guide plate lens 20 is provided on the first main surface 15B of the light guide plate 15. The first light guide plate lens 20 extends along the Y-axis direction (first direction), and a plurality of first light guide plate lenses 20 are disposed side by side along the X-axis direction (second direction). The plurality of first light guide plate lenses 20 are continuously arranged along the X-axis direction with substantially no interval therebetween. In the present embodiment, the first light guide plate lens 20 is a so-called cylindrical lens. The first light guide plate lens 20 has a convex shape protruding from the first main surface 15B to the front side. Specifically, the first light guide plate lens 20 has a semi-circular shape in a cross section taken along the X-axis direction and a semi-cylindrical shape linearly extending along the Y-axis direction, and a surface of the first light guide plate lens 20 is a circular arc-shaped face 20A. When an angle formed by a tangent line at a base end portion of the circular arc-shaped face 20A with respect to the X-axis direction is defined as a "contact angle", the contact angle of the first light guide plate lens 20 is, for example, approximately 51°. The arrangement interval between the first light guide plate lenses 20 (interval between center positions along the X-axis direction) is, for example, approximately 0.041 mm. All the plurality of first light guide plate lenses 20 arranged along the X-axis direction have substantially the same contact angle, substantially the same width dimension, substantially the same arrangement interval, and substantially the same height dimension. In order to integrally provide the light guide plate 15 with the first light guide plate lens 20 having such a configuration, for example, the light guide plate 15 may be manufactured by injection molding, and a transfer shape for transferring the first light guide plate lens 20 may be formed in advance in a molding die for the light guide plate 15 at a molding face for molding the first main surface 15B.

As illustrated in FIG. 3, the second light guide plate lens 21 is provided on the second main surface 15C of the light guide plate 15. The second light guide plate lens 21 extends along the Y-axis direction, and a plurality of second light guide plate lenses 21 are disposed side by side along the X-axis direction. In the present embodiment, the second light guide plate lens 21 is a convex-shaped prism protruding from the second main surface 15C to the back side. Specifically, the second light guide plate lens 21 has a substantially triangular shape (is substantially mountain shaped) in a cross section taken along the X-axis direction and extends linearly along the Y-axis direction. The width dimension (dimension along the X-axis direction) of the second light guide plate lens 21 is constant throughout its entire length along the Y-axis direction. Each second light guide plate lens 21 has an approximately isosceles triangle cross-sectional shape and includes a pair of fourth inclined surfaces 21A. An apex angle (angle formed by the pair of fourth inclined surfaces 21A) of the second light guide plate lens 21 is preferably set to an obtuse angle (angle greater than 90°), specifically, within a range from 100° to 150°, and is most preferably set to 140°. All the plurality of second light guide plate lenses 21 arranged along the X-axis direction have substantially the same apex angle, substantially the same width dimension, substantially the same arrangement interval, and substantially the same height dimension. In the present embodiment, the arrangement interval of the second light guide plate lenses 21 is greater than the arrangement interval of the first light guide plate lenses 20. In order to integrally provide the light guide plate 15 with the second light guide plate lens 21 having such a configuration, for example, the light guide plate 15 may be manufactured by injection molding, and a transfer shape for transferring the second light guide plate lens 21 may be formed in advance in a molding die for the light guide plate 15 at a molding face for molding the second main surface 15C.

According to the light guide plate 15 having such a configuration, as illustrated in FIG. 3, light propagating inside the light guide plate 15 is totally reflected in a repetitive manner by being incident on the circular arc-shaped face 20A of each of the first light guide plate lenses 20 on the side of the first main surface 15B along the Z-axis direction, and travels in a zigzag manner substantially along the X-axis direction. Light propagating inside the light guide plate 15 is totally reflected in a repetitive manner by being incident on the pair of fourth inclined surfaces 21A of each of the second light guide plate lenses 21 on the side of the second main surface 15C along the Z-axis direction, and travels in a zigzag manner substantially along the Y-axis direction. In this way, light propagating inside the light guide plate 15 is restricted from spreading in the X-axis direction, and thus unevenness of darkness and luminance is less likely to occur between a vicinity of the LED 13 and surroundings thereof in the X-axis direction. On the other hand, in the first main surface 15B, light that is not totally reflected by the circular arc-shaped face 20A of the first light guide plate lens 20 is refracted by the circular arc-shaped face 20A and promoted to be emitted from the first main surface 15B.

As illustrated in FIG. 2, the third light guide plate lens 22 is provided on the second main surface 15C of the light guide plate 15. A plurality of the third light guide plate lenses 22 are disposed side by side along the Y-axis direction. The third light guide plate lens 22 protrudes from the second main surface 15C toward the back side along the Z-axis direction. The third light guide plate lens 22 includes a first inclined surface 22A disposed on the side opposite to the LED 13 side (right side in FIG. 2) in the Y-axis direction, a second inclined surface 22B disposed on the side of the LED 13 (left side in FIG. 2) in the Y-axis direction, and a third inclined surface 22C located between the first inclined surface 22A and the second inclined surface 22B in the Y-axis direction. The first inclined surface 22A has an inclination rising to a back side (the first prism sheet 16 side, a protruding direction of the third light guide plate lens 22 from the second main surface 15C) from the side opposite to the LED 13 side (right side in FIG. 2) toward the side of the LED 13 (left side in FIG. 2) along the Y-axis direction in the light guide plate 15. The second light guide plate inclined surface 22B has an inclination rising to a back side from the side of the LED 13 (left side in FIG. 2) toward the side opposite to the LED 13 (right side in FIG. 2) along the Y-axis direction in the light guide plate 15. The third light guide plate inclined surface 22C has an inclination rising to a back side from the side opposite to the LED 13 (right side in FIG. 2) toward the side of the LED 13 (left side in FIG. 2) along the Y-axis direction in the light guide plate 15.

As illustrated in FIG. 2, the first inclined surface 22A and the second inclined surface 22B reflect light propagating inside the light guide plate 15, raise the light toward the front side so as to be at an angle close to the Z-axis direction, and thus can promote emission from the first main surface 15B. Specifically, the first inclined surface 22A mainly functions to reflect and raise light traveling away from the LED 13 in the Y-axis direction. On the other hand, the second inclined surface 22B mainly functions to reflect and raise light traveling toward the LED 13 in the Y-axis direction. The first inclined surface 22A has a gradient in which a distance from the first main surface 15B (a portion on which the third light guide plate lens 22 is not installed) becomes smaller while getting farther from the LED 13 in the Y-axis direction. The first inclined surface 22A has an inclination angle (first angle) θ7 of, for example, approximately 8° formed with respect to the Y-axis direction. The second inclined surface 22B has a gradient in which a distance from the first main surface 15B becomes larger while getting farther from the LED 13 in the Y-axis direction, that is, a gradient opposite to the gradient of the first inclined surface 22A. The second inclined surface 22B has a steep, near-vertical gradient at an inclination angle (second angle) θ8 of, for example, approximately 80° with respect to the Y-axis direction, and the inclination angle is greater than the inclination angle θ7 of the first inclined surface 22A.

Figure 4:
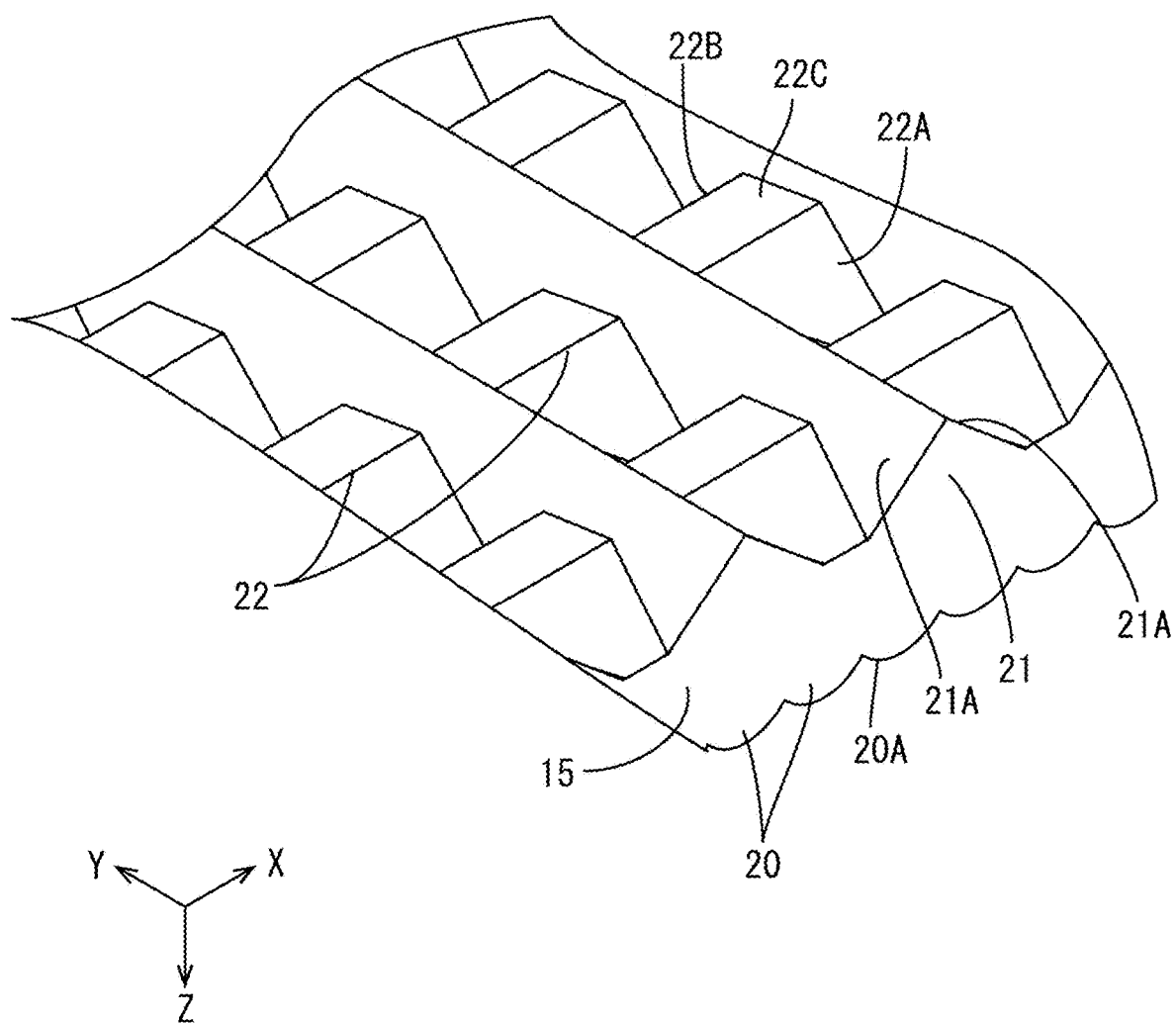
FIG. 4 is a perspective view of a light guide plate constituting the backlight device according to the first embodiment as viewed from the side of a second main surface.

Further, as illustrated in FIGS. 2, 4, and 5, the plurality of third light guide plate lenses 22 arranged along the Y-axis direction are designed such that the height dimension (dimension along the Z-axis direction) and the length dimension (dimension along the Y-axis direction) respectively increase while getting farther from the LED 13 in the Y-axis direction. More specifically, comparing the third light guide plate lens 22 closer to the LED 13 in the Y-axis direction and the third light guide plate lens 22 farther from the LED 13 in the Y-axis direction, the respective areas of the first inclined surface 22A and the second inclined surface 22B of the latter are larger than those of the former. In other words, on the second main surface 15C, the plurality of first inclined surfaces 22A and the plurality of second inclined surfaces 22B arranged at intervals in the Y-axis direction are configured such that the areas thereof increase while getting farther from the LED 13 in the Y-axis direction. In this way, on a side closer to the LED 13 in the Y-axis direction, light is less likely to be incident on the first inclined surface 22A and the second inclined surface 22B of the third light guide plate lens 22, and light emission is suppressed, while on a side farther from the LED 13 in the Y-axis direction, light is more likely to be incident on the first inclined surface 22A and the second inclined surface 22B of the third light guide plate lens 22, and light emission is promoted. As a result, the amount of emission light from the first main surface 15B is made uniform between the side of the LED 13 and the side opposite to the LED 13 in the Y-axis direction.

As illustrated in FIG. 2, in the third inclined surface 22C, an end portion on the side opposite to the LED 13 side along the Y-axis direction (right side in FIG. 2) is continuous with the first inclined surface 22A, and an end portion on the side of the first LED 13 along the Y-axis direction (left side in FIG. 2) is continuous with the second inclined surface 22B. The third inclined surface 22C has a gradient in which a distance from the first main surface 15B (a portion on which the third light guide plate lens 22 is not installed) becomes larger while getting farther from the LED 13 in the Y-axis direction. That is, the third inclined surface 22C has a gradient similar to that of the second inclined surface 22B. The third inclined surface 22C has an inclination angle (third angle) θ9 of, for example, approximately 1.4° with respect to the Y-axis direction, and the inclination angle is smaller than any of the inclination angles θ7 and θ8 of the first inclined surface 22A and the second inclined surface 22B, respectively. The third inclined surface 22C having such a configuration reflects light traveling away from the LED 13 inside the light guide plate 15, and thus the light is directed toward the first main surface 15B, but an angle of incidence of the light with respect to the first main surface 15B does not exceed a critical angle. Thus, the light is totally reflected by the first main surface 15B, and is guided so as to get farther from the LED 13. Accordingly, emission light from the first main surface 15B is less likely to be biased toward the side of the LED 13 in the Y-axis direction. As described above, in the second main surface 15C of the light guide plate 15, the inclination angle θ9 of the third inclined surface 22C with respect to the Y-axis direction is the smallest, the inclination angle θ7 of the first inclined surface 22A with respect to the Y-axis direction is larger than the inclination angle θ9, and the inclination angle θ8 of the second inclined surface 22B with respect to the Y-axis direction is the largest. Further, a plurality of the third inclined surface 22C arranged along the Y-axis direction are designed such that the length dimension decreases while getting farther from the LED 13 in the Y-axis direction. The reason is that the length dimension of the third light guide plate lens 22 increases while getting farther from the LED 13 in the Y-axis direction, and an occupancy range of the third light guide plate lens 22 increases.

As illustrated in FIGS. 3 to 5, the third light guide plate lens 22 having the configuration described above is sandwiched between two second light guide plate lenses 21 adjacent to each other in the X-axis direction. Thus, the third light guide plate lens 22 is repeatedly disposed alternately with the second light guide plate lens 21 in the X-axis direction. In the third light guide plate lens 22, a maximum value of a protrusion dimension (height dimension) from the second main surface 15C is set smaller than a corresponding protrusion dimension of the second light guide plate lens 21. Thus, even the third light guide plate lens 22 located on the farthest side from the LED 13 in the Y-axis direction does not protrude farther toward the back side than the second light guide plate lens 21.

Figure 6:
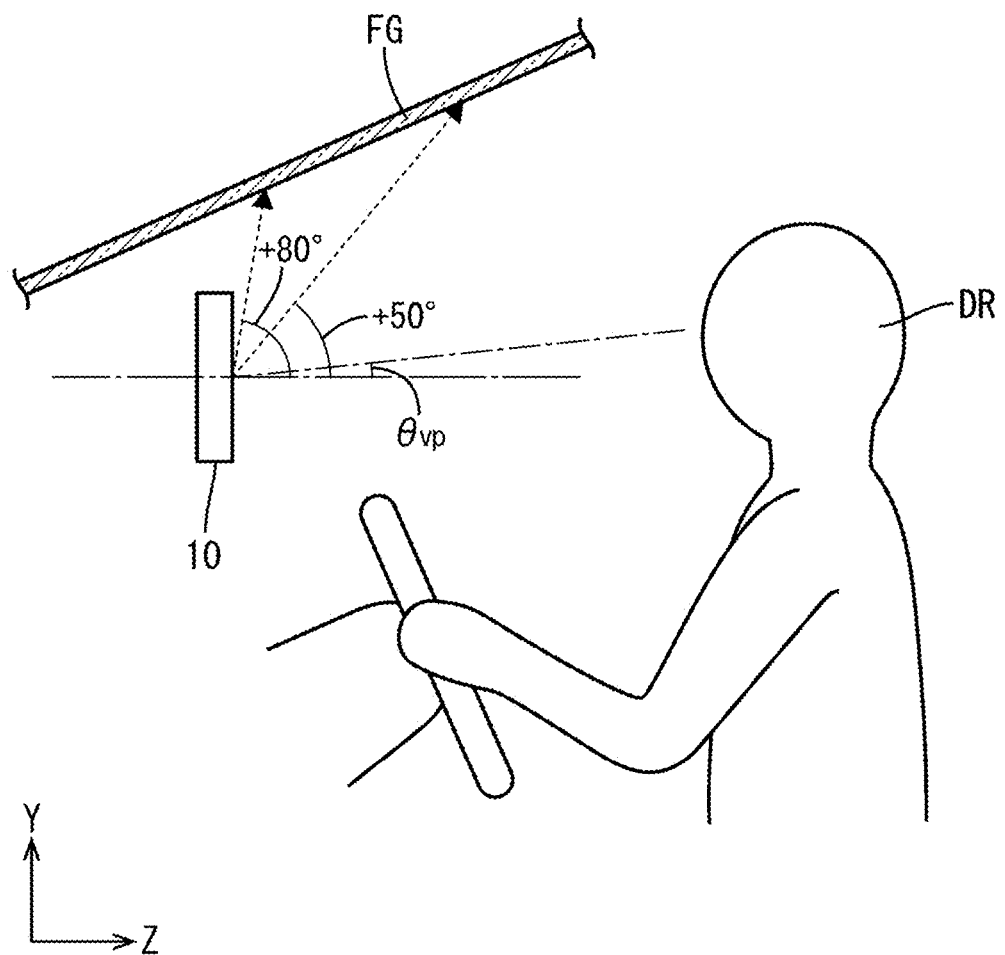
FIG. 6 is a schematic view illustrating a state in which the liquid crystal display device according to the first embodiment is mounted on a passenger car.

As illustrated in FIG. 6, the liquid crystal display device 10 for vehicle application according to the present embodiment is installed in a posture in which the X-axis direction and the Z-axis direction substantially match the horizontal direction and the Y-axis direction is parallel to the vertical direction. Here, the "posture in which the Y-axis direction is parallel to the vertical direction" may be a posture in which the Y-axis direction matches the vertical direction, but may also be a posture in which the Y-axis direction includes the vertical direction as a component of a vector, that is, a posture in which the Y-axis direction is slightly inclined with respect to the vertical direction. The Z-axis direction matches a front direction of the liquid crystal display device 10 for vehicle application. A driver (user) DR is present on the front side (right side in FIG. 6) of the liquid crystal display device 10 for vehicle application. The liquid crystal display device 10 for vehicle application is installed such that the line of sight of the driver DR is inclined upward with respect to the front direction (Z-axis direction). An angle (peak angle) that corresponding to the peak luminance in the light distribution pertaining to the emission light from the liquid crystal display device 10 for vehicle application matches an angle θvp formed by the line of sight of the driver DR with respect to the front direction of the liquid crystal display device 10 for vehicle application. That is, the liquid crystal display device 10 for vehicle application is installed so that the driver DR can visually recognize the display image in the brightest state.

As illustrated in FIG. 6, a windshield FG of a passenger car is present above the liquid crystal display device 10 for vehicle application in the Y-axis direction. The LED 13 is located near a lower end portion of the liquid crystal display device 10 in the Y-axis direction in FIG. 6, and the light-emitting face 13A is oriented upward in the Y-axis direction in FIG. 6. Here, among the emission light from the liquid crystal display device 10 for vehicle application, part of the light directed toward the windshield FG is reflected by the windshield FG and is directed toward the driver DR. Such reflected light may be visually recognized by the driver DR as "reflection" which is an image reflected on the windshield FG. Here, the front direction of the liquid crystal display device 10 for vehicle application is defined as 0° (reference), an angle on the upper side (side away from the LED 13) in the Y-axis direction in FIG. 6 with respect to the front direction is defined as "+ (plus)", and an angle on the lower side (side closer to the LED 13) in the Y-axis direction in FIG. 6 with respect to the front direction is defined as "– (minus)". Light recognized as the above-described "reflection" is light emitted in the range of "+50° to +80°" among the emission light from the liquid crystal display device 10 for vehicle application. In the present embodiment, light in the emission angle range (+50° to +80°) that is recognized as the "reflection" is defined as "side lobe light". In order to suppress such side lobe light, a louver has been used in the related art. However, since the louver has a high component price, there has been a demand for suppressing the side lobe light by regulating the emission angle of light at a low cost without using the louver, and preventing the reflection on the windshield FG. In the present embodiment, the above-described angle θvp (peak angle) is, for example, "+6°".

Thus, as illustrated in FIGS. 1 and 3, the backlight device 12 according to the present embodiment includes the first prism sheet 16 and the light absorption sheet 17. First, the first prism sheet 16 will be described in detail. The first prism sheet 16 is disposed so as to overlap the back side of the light guide plate 15. The first prism sheet 16 includes a first base material 16A having a sheet shape, and a first prism 16B provided on the first base material 16A. A pair of main surfaces of the first base material 16A includes a third main surface 16A1 and a fourth main surface 16A2. The third main surface 16A1 is a main surface of the first base material 16A on the front side facing the light guide plate 15, and emits light toward the light guide plate 15. The fourth main surface 16A2 is a main surface of the first base material 16A on the back side facing the light absorption sheet 17.

The first base material 16A is made of substantially transparent synthetic resin, and is specifically formed of, for example, a crystalline transparent resin material such as PET that is the same as the second base material 18A. The first prism 16B is formed of an ultraviolet-curing resin material being substantially transparent and being a type of photo-curable resin material. A manufacturing method of the first prism sheet 16 is similar to the manufacturing method of the second prism sheet 18 described above. The ultraviolet-curing resin material constituting the first prism 16B is, for example, a crystalline transparent resin material such as PET, and a refractive index of the ultraviolet-curing resin material is set to, for example, approximately 1.65.

As illustrated in FIG. 3, the first prism 16B is provided on the fourth main surface 16A2 of the first base material 16A on the back side. Specifically, the first prism 16B is provided so as to protrude from the fourth main surface 16A2 of the first base material 16A toward the back side (light absorption sheet 17 side) along the Z-axis direction. The first prism 16B has a substantially triangular shape (is substantially mountain shaped) in a cross section taken along the X-axis direction and also extends linearly along the Y-axis direction (first direction), and a plurality of the first prisms 16B are continuously disposed side by side with substantially no interval along the X-axis direction (second direction) on the fourth main surface 16A2 of the first base material 16A. The plurality of first prisms 16B are continuously arranged along the X-axis direction with substantially no interval therebetween. The first prism 16B includes a first base 16B1 parallel to the X-axis direction, and a pair of first oblique sides 16B2 and 16B3 rising from both ends of the first base 16B1. Among the pair of first oblique sides 16B2 and 16B3 of the first prism 16B, the oblique side located on one side (left side in FIG. 3) in the X-axis direction is referred to as one first oblique side 16B2, and the oblique side located on the other side (right side in FIG. 3) in the X-axis direction is referred to as the other first oblique side 16B3.

As illustrated in FIG. 3, in the first prism 16B, an inclination angle (first bottom angle) θ10 of the one first oblique side 16B2 with respect to the base 16B1, and an inclination angle (second bottom angle) θ11 of the other first oblique side 16B3 with respect to the base 16B1, are identical.

That is, the first prism 16B has a symmetric cross-sectional shape, which is that of an isosceles triangle. Specifically, the respective inclination angles θ10 and θ11 of the pair of first oblique sides 16B2 and 16B3 with respect to the base 16B1 in the first prism 16B are preferably within a range from 40° to 50°, and are most preferably 45°. On the other hand, an angle (third apex angle) θ12 formed by the pair of first oblique sides 16B2 and 16B3 of the first prism 16B is preferably within a range from 80° to 100°, and is most preferably 90°, that is, a right angle. Note that all the plurality of first prisms 16B arranged along the X-axis direction have substantially the same height dimension, substantially the same width dimension for the first base 16B1, substantially the same inclination angles for the first oblique sides 16B2 and 16B3 with respect to the first base 16B1, and the like, and are arranged such that the arrangement intervals between adjacent first prisms 16B are substantially constant and equal.

According to such a configuration, as illustrated in FIG. 2, when the light emitted from the LED 13 and incident on the light incident end face 15A of the light guide plate 15 reaches the first inclined surface 22A having an inclination rising from the side opposite to the LED 13 side toward the LED 13 side in the Y-axis direction on the second main surface 15C in the process of propagating inside the light guide plate 15, a large amount of the light is reflected by the first inclined surface 22A, but the remaining light is refracted and emitted from the first inclined surface 22A toward the back side. Among the light, the light reflected by the first inclined surface 22A is directed toward the first main surface 15B, and is reflected again by the first main surface 15B or emitted from the first main surface 15B. On the other hand, the light emitted from the first inclined surface 22A is directed toward the first prism sheet 16. The light directed from the first inclined surface 22A toward the first prism sheet 16 is reflected by the third main surface 16A1 of the first prism sheet 16 (the interface between the first base material 16A and the air layer) or is incident on the first prism sheet 16. When the light reflected by the third main surface 16A1 of the first prism sheet 16 is incident on the second main surface 15C of the light guide plate 15, the light is emitted from the first main surface 15B as it is or emitted from the first main surface 15B after propagating inside the light guide plate 15.

As illustrated in FIG. 3, the light incident on the first prism sheet 16 is reflected by the first base 16B1 (the interface between the first base material 16A and the first prism 16B) of the first prism 16B or by the pair of first oblique sides 16B2 and 16B3 of the first prism 16B, so that the light is emitted from the first prism sheet 16 and is directed toward the second main surface 15C of the light guide plate 15. Specifically, the light incident on the third main surface 16A1 of the first base material 16A is emitted from the third main surface 16A1 toward the front side (light guide plate 15 side) through any path of being totally reflected at the interface between the first base material 16A and the first prism 16B, being incident on the first prism 16B, being reflected by the one first oblique side 16B2, traveling toward the other first oblique side 16B3, and being reflected by the other first oblique side 16B3, or being reflected by the other first oblique side 16B3, traveling toward the one first oblique side 16B2, and being reflected by the one first oblique side 16B2. When the light emitted from the first prism sheet 16 to the front side is incident on the second main surface 15C of the light guide plate 15, the light is emitted from the first main surface 15B as it is or emitted from the first main surface 15B after propagating inside the light guide plate 15.

The light reaching the second main surface 15C in the process of propagating inside the light guide plate 15 and refracted by the first inclined surface 22A is angled in accordance with the refractive index of the light guide plate 15 and the inclination angle θ7 of the first inclined surface 22A with respect to the Y-axis direction. Specifically, in the present embodiment, the emission light from the second main surface 15C of the light guide plate 15 contains the largest amount of light that forms an angle of about 10° (80° with respect to the Z-axis direction) on the first prism sheet 16 side (lower side in FIG. 2) with respect to the Y-axis direction. That is, the emission light from the second main surface 15C of the light guide plate 15 has such high directivity that the light with an angle of about 10° on the first prism sheet 16 side with respect to the Y-axis direction exhibits peak luminance, and hardly contains diffused light. As a result, the emission light from the second main surface 15C of the light guide plate 15 is specularly reflected by the third main surface 16A1 of the first prism sheet 16 and the first base 16B1 of the first prism 16B with high efficiency (specifically, an average reflectivity of the P-wave and the S-wave is about 40%), and is efficiently totally reflected by the pair of first oblique sides 16B2 and 16B3 of the first prism 16B, and diffused light is hardly contained in any of the reflected light. Thus, light emitted in the range of "+50° to +80°", that is, the side lobe light is less likely to be contained in the emission light from the backlight device 12. As described above, the emission angle of light can be regulated without using the louver as in the related art, and the side lobe light can be reduced.

Next, the light absorption sheet 17 will be described in detail. As illustrated in FIGS. 1 to 3, the light absorption sheet 17 has a main surface parallel to each of the main surfaces of the light guide plate 15 and the first prism sheet 16, and is also disposed so as to cover the fourth main surface 16A2 of the first prism sheet 16. The light absorption sheet 17 is disposed to overlap substantially all over the fourth main surface 16A2 of the first prism sheet 16. The light absorption sheet 17 is made of, for example, PET having a surface exhibiting black, and has light absorbability higher than that of any of the light guide plate 15 and the first prism sheet 16. Among the pair of main surfaces of the light absorption sheet 17, the main surface on the front side is a light absorption main surface (fifth main surface) 17A that is disposed to face the fourth main surface 16A2 of the first prism sheet 16 and absorbs light.

According to such a configuration, the light emitted from the fourth main surface 16A2 of the first prism sheet 16 toward the back side is directed toward the light absorption sheet 17 and is efficiently absorbed by the light absorption main surface 17A. Here, since the light emitted from the fourth main surface 16A2 of the first prism sheet 16 has characteristics similar to diffused light in many cases, by absorbing the light by the light absorption sheet 17, the emission angle pertaining to the emission light from the backlight device 12 can be more satisfactorily regulated. Thus, the side lobe light can be further reduced. Since the amount of emission light from the fourth main surface 16A2 of the first prism sheet 16 is small, even when the light is absorbed by the light absorption sheet 17, the influence on the luminance pertaining to the emission light from the backlight device 12 is small.

Figure 7:
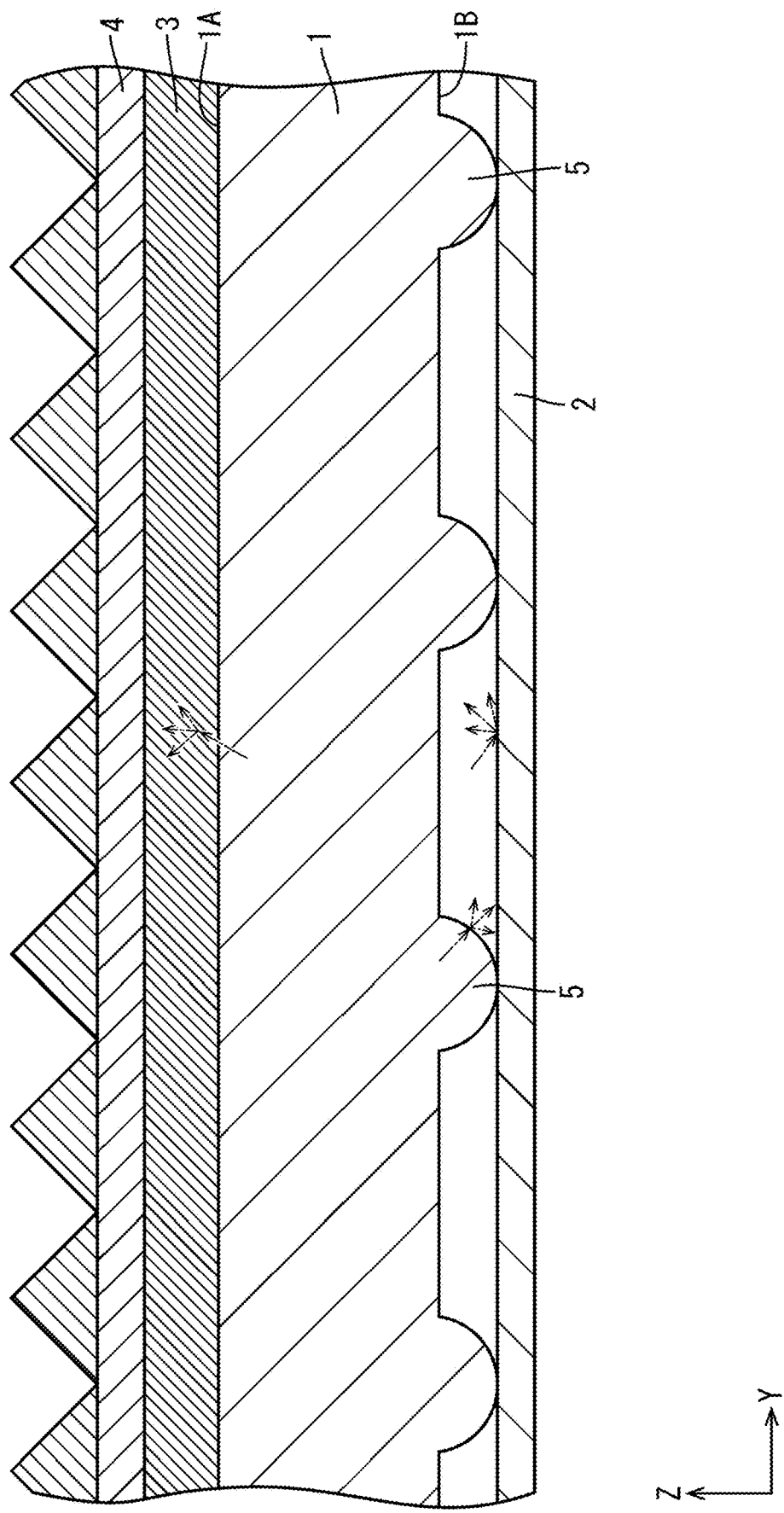
FIG. 7 is a cross-sectional view of a backlight device of a type B according to the first embodiment taken along the Y-axis direction.

Next, in order to validate the advantages of the backlight device 12 and the liquid crystal display device 10 according to the present embodiment, the following Comparative Experiments 1 and 2 were performed. First of all, a description will be given on Comparative Experiment 1. In Comparative Experiment 1, light distributions pertaining to emission light of backlight devices of following Example 1 and Comparative Examples 1 to 4 were obtained. In Example 1, the backlight device 12 has the same configuration as that described before Comparative Experiment 1. In Comparative Examples 1 to 4, the backlight devices have configurations different from the configuration of Example 1. Specifically, as illustrated in FIG. 7, each of the backlight devices of Comparative Examples 1, 2, and 4 includes at least a light guide plate 1, a light reflective sheet 2 layered on the back side of the light guide plate 1, a light diffuser sheet 3 layered on the front side of the light guide plate 1, and a prism sheet 4 layered on the front side of the light diffuser sheet 3 in addition to the LED as the light source. The light guide plate 1 included in the backlight device of each of Comparative Examples 1, 2, and 4 has, on a main surface 1B on the back side, a light reflective portion 5 that raises light toward the front side by diffusing and reflecting the light. The light reflective portion 5 is formed of rough surfaces (fine unevenness) selectively provided on the main surface 1B on the back side of the light guide plate 1. Part of the light diffused and reflected by the light reflective portion 5 is emitted from the main surface 1A on the front side of the light guide plate 1. The light reflective sheet 2 has a surface exhibiting white and high light reflectivity. Light emitted from the main surface 1B on the back side of the light guide plate 1 can be diffused and reflected by the light reflective sheet 2 to be incident on the light guide plate 1 again. The light diffuser sheet 3 contains a diffusing agent that diffuses and reflects the light. Since the prism sheet 4 has substantially the same configuration as the third prism sheet 19 (see FIG. 3) described before Comparative Experiment 1, a detailed description of the configuration of the prism sheet 4 is omitted here.

The backlight device of Comparative Example 1 includes the louver as in the related art in addition to the configuration illustrated in FIG. 7. In the backlight device of Comparative Example 1, the louver is layered on the front side with respect to the prism sheet 4. The louver has a configuration in which light blocking portions and light transmitting portions are alternately and repeatedly arranged along the Y-axis direction, and an emission angle of light transmitted through the light transmitting portion is regulated by two light blocking portions sandwiching the light transmitting portion. On the other hand, the backlight device of Comparative Example 2 has a configuration as illustrated in FIG. 7. The backlight device of Comparative Example 4 includes the first prism sheet 16 (see FIGS. 2 and 3) in addition to the configuration illustrated in FIG. 7. In the backlight device of Comparative Example 4, the first prism sheet 16 is interposed between the light guide plate 1 and the light reflective sheet 2 (see FIG. 7). On the other hand, the backlight device of Comparative Example 3 has a configuration in which the first prism sheet 16 is removed from the backlight device 12 (see FIGS. 2 and 3) in Example 1, and the light reflective sheet 2 (see FIG. 7) is provided instead of the light absorption sheet 17. Hereinafter, as in Example 1 and Comparative Example 3, a type of the backlight device including the light guide plate 15, the second prism sheet 18, and the third prism sheet 19 illustrated in FIGS. 2 and 3 in addition to the LED 13 is referred to as a "type A". As in Comparative Examples 1, 2, and 4, a type of the backlight device including the light guide plate 1, the light reflective sheet 2, the light diffuser sheet 3, the prism sheet 4, and the light reflective portion 5 illustrated in FIG. 7 in addition to the LED is referred to as a "type B". Thus, Example 1 and Comparative Example 3 are classified into the type A, and Comparative Examples 1, 2, and 4 are classified into the type B. It can be said that Example 1 has a configuration in which the first prism sheet 16 and the light absorption sheet 17 are included in the type A. It can be said that Comparative Example 3 has a configuration in which the first prism sheet 16 is not included and the light reflective sheet 2 is included in the type A.

Figure 8:
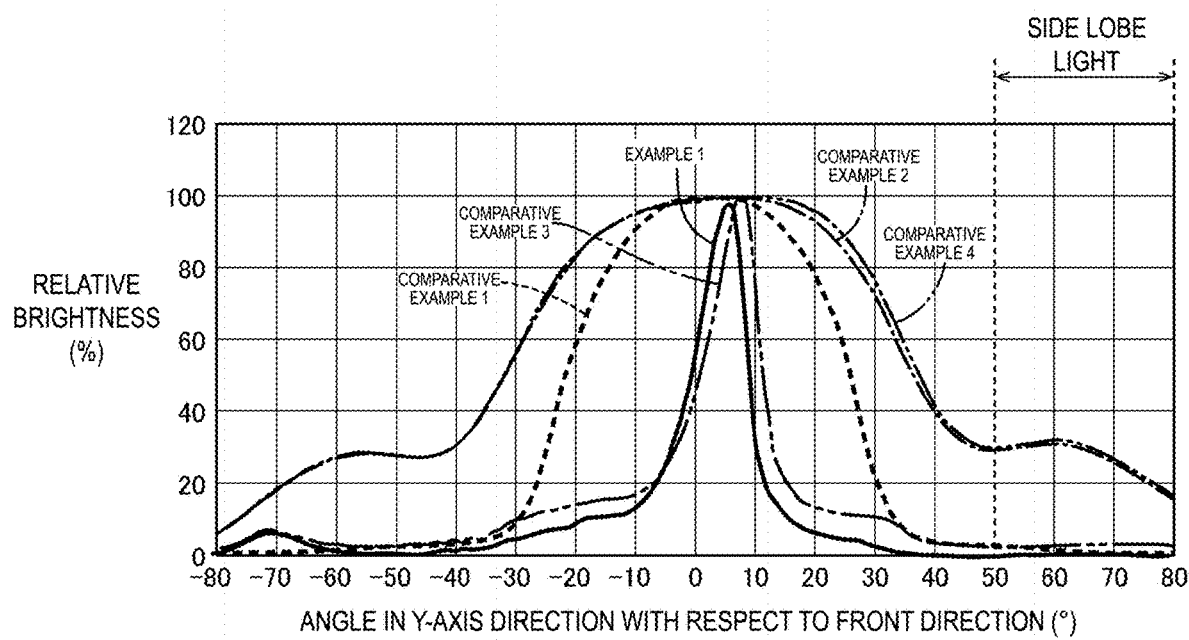
FIG. 8 is a graph showing a light distribution in the Y-axis direction in Comparative Experiment 1 according to the first embodiment.

In Comparative Experiment 1, by using the backlight devices of Example 1 and Comparative Examples 1 to 4 as described above, luminance pertaining to the emission light was measured in a state where the LED was turned on, and graphs pertaining to light distributions (luminance angle distributions) in the Y-axis direction were produced. Experimental results pertaining to light distributions in Comparative Experiment 1 are as shown in FIG. 8. In the graphs pertaining to light distributions shown in FIG. 8, a horizontal axis is an angle (in units of "°") in the Y-axis direction with respect to the front direction (Z-axis direction), and a vertical axis is relative luminance (in units of "%") with peak luminance as a reference (100%). Among the positive and negative symbols provided to the angles in the horizontal axis in FIG. 8, "− (negative)" refers to the lower side (side opposite to the windshield FG side) in FIG. 6 in the Y-axis direction (vertical direction) with respect to 0° (front direction) as a reference value when the backlight device 12 is viewed from the front, and "+ (positive)" refers to the upper side (windshield FG side) in FIG. 6 in the Y-axis direction with respect to 0° (front direction) as the reference value when the backlight device 12 is viewed from the front. In FIG. 8, the graph of Example 1 is shown by a solid line, the graph of Comparative Example 1 is shown by a broken line, the graph of Comparative Example 2 is shown by a one dot chain line, the graph of Comparative Example 3 is shown by a thick two dot chain line, and the graph of Comparative Example 4 is shown by a thin two dot chain line.

The experimental results of Comparative Experiment 1 will be described. According to FIG. 8, in each light distribution in Comparative Examples 1, 2, and 4, the peak angle that is the angle at which light exhibits the peak luminance is "+3°", and a half width (full width at half maximum; FWHM) is wider than a half width of the light distribution in Example 1. The reason why the half width of each light distribution in Comparative Examples 1, 2, and 4 is wider than the half width of the light distribution in Example 1 is presumed to be that the light is diffused and reflected by each of the light reflective sheet 2, the light diffuser sheet 3, and the light reflective portion 5 included in the backlight device of the type B. On the other hand, in the light distribution in Example 1, the peak angle that is the angle at which light exhibits the peak luminance is "+6°". In the light distribution in Comparative Example 3, the peak angle that is the angle at which light exhibits the peak luminance is "+8°". Each of the light distributions of Example 1 and Comparative Example 3 has a narrower half width than the half widths of Comparative Examples 1, 2, and 4. The reason why the half width of each of the light distributions in Example 1 and Comparative Example 3 is narrower than the half width of each of the light distributions in Comparative Examples 1, 2, and 4 is presumed to be that a high light condensing effect is imparted in the Y-axis direction by the two prism sheets 18 and 19 included in the backlight device of the type A and that diffuse and reflection hardly occurs in any of the light guide plate 15 and the prism sheets 18 and 19. The reason why the peak angle of the light distribution in Comparative Example 3 is larger than the peak angle of the light distribution in Example 1 is presumed to be due to an influence in which the first prism sheet 16 is not included, so that reflected light by the first prism sheet 16 is not present, and the light is diffused and reflected by the light reflective sheet 2.

According to the light distribution in Comparative Example 1, the side lobe light, each of which is light emitted in the range of "+50° to +80°", is suppressed to be sufficiently low. The reason for this is presumed to be that even when the light is diffused and reflected by each of the light reflective sheet 2, the light diffuser sheet 3, and the light reflective portion 5 included in the backlight device of the type B, the emission angle range of light is favorably regulated in the Y-axis direction by the louver. According to the light distribution in each of Comparative Examples 2 and 4, the side lobe light has a relative luminance of approximately 20% or more, and the reflection caused by the side lobe light is easily visually recognized. The reason for this is presumed to be that Comparative Example 2 does not include a configuration for limiting the emission angle range of light diffused and reflected by each of the light reflective sheet 2, the light diffuser sheet 3, and the light reflective portion 5 included in the backlight device of the type B. In the light distribution in Example 1, the side lobe light, which is the light emitted in the range of "+50° to +80°", is suppressed to be sufficiently low to an extent close to the light distribution in Comparative Example 1. The reason for this is presumed to be that the diffuse reflection hardly occurs in any of the light guide plate 15 and each of the prism sheets 18 and 19 included in the backlight device of the type A, and in particular, the light emitted from the first inclined surface 22A toward the back side is appropriately angled, so that the light can be efficiently specularly reflected or totally reflected by the first prism sheet 16. Further, it is presumed that the absorption of the diffused light emitted from the first prism sheet 16 by the light absorption sheet 17 also contributes to the suppression of the side lobe light. In the light distribution in Comparative Example 3, the side lobe light is suppressed as compared with each of the light distributions of Comparative Examples 2 and 4, but the side lobe light is slightly increased as compared with each of the light distributions of Example 1 and Comparative Example 1. The reason for this is presumed to be that since Comparative Example 3 is the backlight device of the type A, the emission angle range of light is regulated, but the light reflected by the first prism sheet 16 is not present, and the light is diffused and reflected by the light reflective sheet 2.

Next, a description will be given on Comparative Experiment 2. In Comparative Experiment 2, ratios pertaining to the side lobe light were extracted from the light distributions obtained using the backlight devices of Example 1 and Comparative Examples 1 to 4 described in Comparative Experiment 1. In Comparative Experiment 2, by using the backlight devices of Example 1 and Comparative Examples 1 to 4, the luminance pertaining to the emission light was measured in a state where the LED was turned on, the light distributions in the Y-axis direction were obtained, and the relative luminance (unit is "%") at each angle of +50°, +60°, +70°, and +80° in the light distributions in the Y-axis direction was extracted. The relative luminance at each angle of +50°, +60°, +70°, and +80° uses peak luminance at the peak angle as a reference (100%). Here, the significance of extracting the relative luminance at each angle of +50°, +60°, +70°, and +80° is to present an index regarding whether the "reflection" caused by the side lobe light (light emitted in the range of +50° to) +80° is easily visually recognized. That is, in order that the "reflection" is less likely to be visually recognized, the relative luminance at each angle of +50°, +60°, +70°, and +80° is preferably 3% or less.

Experimental results of Comparative Experiment 2 are as shown in a table in FIG. 9. The table in FIG. 9 shows information (peak angle, backlight type, presence of the louver, presence of the first prism sheet 16, presence of the light absorption sheet 17, presence of the light reflective sheet 2) regarding the configurations of Example 1 and Comparative Examples 1 to 4 and the relative luminance at each angle of +50°, +60°, +70°, and +80°, which are experimental results. The peak angle is "+6°" in Example 1, "+3°" in Comparative Examples 1, 2, and 4, and "+8°" in Comparative Example 3. The backlight type indicates a type of the backlight device, and is either the type A or the type B described above. The louver is included only in Comparative Example 1. The first prism sheet 16 is included in Example 1 and Comparative Example 4. The light absorption sheet 17 is included only in Example 1. The light reflective sheet 2 is included in Comparative Examples 1 to 4.

The experimental results of Comparative Experiment 2 will be described. According to FIG. 9, in Comparative Examples 2 to 4, since the relative luminance exceeds 3% at any angle of +50°, +60°, +70°, and +80°, it can be said that the reflection caused by the side lobe light is easily visually recognized. In particular, in Comparative Examples 2 and 4, the relative luminance exceeds 20% at each angle of +50°, +60°, and +70°, and it can be said that the reflection tends to be particularly easily visually recognized. In Comparative Example 3, the relative luminance at each angle exceeds 3% as the reference value but is suppressed to 5% or less, so that the reflection is suppressed as compared with Comparative Examples 2 and 4. The reason for this is presumed to be that, in Comparative Example 3, although the first prism sheet 16 is not included, Comparative Example 3 is the type A, so that the directivity of the emission light is high. In Comparative Example 4, the first prism sheet 16 was included, but the largest amount of side lobe light was generated. It is presumed that this suggests that since a large amount of diffuse reflection light is generated in the backlight device of the type B, the emission angle range of light is difficult to be controlled even when the first prism sheet 16 is used in combination. On the other hand, in Example 1 and Comparative Example 1, the relative luminance is 3% or less at any angle of +50°, +60°, +70°, and +80°, it can be said that the reflection caused by the side lobe light is less likely to be sufficiently visually recognized. In Comparative Example 1, the side lobe light is most suppressed. The reason for this is presumed to be that the emission angle range of light is well regulated by the louver. On the other hand, in Example 1, although the louver is not used, the side lobe light is suppressed to an extent close to Comparative Example 1. This is presumed to be that by using the first prism sheet 16 and the light absorption sheet 17 in the backlight device of the type A, the emission angle range of light can be regulated while suppressing the generation of the diffuse reflection light. As described above, according to Example 1, the reflection caused by the side lobe light can be sufficiently suppressed at low cost without using the louver.

As described above, the backlight device (illumination device) 12 of the present embodiment includes the LED (light source) 13, the light guide plate 15 including the light incident end face (first end face) 15A that is at least some of outer peripheral end faces of the light guide plate 15 and faces the LED 13 and on which light is incident, the first main surface 15B that is the one main surface of the light guide plate 15, and the second main surface 15C that is the other main surface of the light guide plate 15, the first prism sheet 16 including the third main surface 16A1 that is the one main surface of the first prism sheet 16 and disposed to face the second main surface 15C and the fourth main surface 16A2 that is the other main surface of the first prism sheet 16, in which the second main surface 15C of the light guide plate 15 is provided with the first inclined surface 22A that is the inclination rising from the side opposite to the LED 13 side toward the LED 13 side in the first direction including the direction from the LED 13 toward the light guide plate 15, the fourth main surface 16A2 of the first prism sheet 16 is provided with the plurality of first prisms 16B extending along the first direction and arranged along the second direction intersecting the first direction and along the fourth main surface 16A2, and the first prism 16B includes the first base 16B1 parallel to the second direction and the pair of first oblique sides 16B2 and 16B3 rising from both ends of the first base 16B1.

Light emitted from the LED 13 is incident on the light incident end face 15A of the light guide plate 15 and propagates inside the light guide plate 15. When the light propagating inside the light guide plate 15 reaches the first inclined surface 22A having an inclination rising from the side opposite to the LED13 side toward the LED13 side in the first direction on the second main surface 15C, a large amount of the light is reflected by the first inclined surface 22A, and the remaining light is refracted and emitted from the first inclined surface 22A. The light reflected by the first inclined surface 22A is directed toward the first main surface 15B, and is reflected again by the first main surface 15B or emitted from the first main surface 15B. The light emitted from the first inclined surface 22A is directed toward the first prism sheet 16. The light directed toward the first prism sheet 16 is reflected by the third main surface 16A1 of the first prism sheet 16 or is incident on the first prism sheet 16. When the light reflected by the third main surface 16A1 of the first prism sheet 16 is incident on the second main surface 15C of the light guide plate 15, the light is emitted from the first main surface 15B as it is or emitted from the first main surface 15B after propagating inside the light guide plate 15. The light incident on the first prism sheet 16 is reflected by the first base 16B1 of the first prism 16B or by the pair of first oblique sides 16B2 and 16B3 of the first prism 16B, so that the light is emitted from the first prism sheet 16 and is directed toward the second main surface 15C of the light guide plate 15. When the light emitted from the first prism sheet 16 to the light guide plate 15 side is incident on the second main surface 15C of the light guide plate 15, the light is emitted from the first main surface 15B as it is or emitted from the first main surface 15B after propagating inside the light guide plate 15.

The light reaching the second main surface 15C in the process of propagating inside the light guide plate 15 and refracted by the first inclined surface 22A is angled in accordance with the refractive index of the light guide plate 15 and the inclination angle of the first inclined surface 22A with respect to the first direction. That is, the diffused light is hardly contained in the emission light from the second main surface 15C of the light guide plate 15. Thus, the diffused light is hardly contained in the light reflected by the third main surface 16A1 of the first prism sheet 16, the light reflected by the first base 16B1 of the first prism 16B, and the light reflected by the pair of first oblique sides 16B2 and 16B3 of the first prism 16B, so that the side lobe light emitted at an angle close to the first direction is less likely to be contained in the emission light from the backlight device 12. Thus, the emission angle of light can be regulated without using the louver as in the related art, and the side lobe light can be reduced.

In addition, the light absorption sheet 17 including the light absorption main surface (fifth main surface) 17A that is the one main surface and disposed to face the fourth main surface 16A2 and having light absorbability higher than any of the light guide plate 15 and the first prism sheet 16 is included. The light emitted from the fourth main surface 16A2 of the first prism sheet 16 is directed toward the light absorption sheet 17. The light absorption sheet 17 has the light absorbability higher than any of the light guide plate 15 and the first prism sheet 16, so that the light absorption sheet 17 can efficiently absorb the light emitted from the fourth main surface 16A2 by the light absorption main surface 17A. Here, since the light emitted from the fourth main surface 16A2 of the first prism sheet 16 has characteristics similar to diffused light in many cases, by absorbing the light by the light absorption sheet 17, the emission angle pertaining to the emission light from the backlight device 12 can be more satisfactorily regulated, and the side lobe light can be further reduced. Since the amount of emission light from the fourth main surface 16A2 of the first prism sheet 16 is small, even when the light is absorbed by the light absorption sheet 17, the influence on the luminance pertaining to the emission light from the backlight device 12 is small.

The second prism sheet 18 including the second light emission main surface (seventh main surface) 18A1 that is the one main surface of the second prism sheet 18 and the second light incident main surface (eighth main surface) 18A2 that is the other main surface of the second prism sheet 18 and disposed to face the first main surface 15B, and the third prism sheet 19 including the third light emission main surface (ninth main surface) 19A1 that is the one main surface of the third prism sheet 19 and the third light incident main surface (tenth main surface) 19A2 that is the other main surface of the third prism sheet 19 and disposed to face the second light emission main surface 18A1, in which the second light emission main surface 18A1 of the second prism sheet 18 is provided with the plurality of second prisms 18B extending along the second direction and disposed side by side along the first direction, and the third light emission main surface 19A1 of the third prism sheet 19 is provided with the plurality of third prisms 19B extending along the second direction and disposed side by side along the first direction. When the light emitted from the first main surface 15B of the light guide plate 15 is incident on the second light incident main surface 18A2 of the second prism sheet 18, the light is emitted from the second light emission main surface 18A1 while being selectively imparted with a condensing action in the first direction by the plurality of second prisms 18B extending along the second direction on the second light emission main surface 18A1. When the light emitted from the second light emission main surface 18A1 of the second prism sheet 18 is incident on the third light incident main surface 19A2 of the third prism sheet 19, the light is emitted from the third light emission main surface 19A1 while being selectively imparted with the condensing action in the first direction by the plurality of third prisms 19B extending along the second direction on the third light emission main surface 19A1. As described above, since the emission light from the light guide plate 15 is selectively imparted with the condensing action in the first direction by the second prisms 18B and the third prisms 19B, the emission angle of light can be more satisfactorily regulated, and the side lobe light can be further reduced.

In addition, the second prism 18B includes the second base 18B1 parallel to the first direction and the pair of second oblique sides 18B2 and 18B3 rising from both ends of the second base 18B1, and among the pair of second oblique sides 18B2 and 18B3, the second LED-side oblique side 18B2 that is the second oblique side located on the side of the LED13 in the first direction forms a larger angle with respect to the second base 18B1 than the second opposite-to-LED-side oblique side 18B3 that is the second oblique side located on the side opposite to the LED13 side in the first direction. In this way, the light incident on the second light incident main surface 18A2 of the second prism sheet 18 is less likely to be incident on the second LED-side oblique side 18B2 that is the second oblique side located on the side of the LED 13 in the first direction than the second opposite-to-LED-side oblique side 18B3 that is the second oblique side located on the side opposite to the LED 13 side in the first direction among the pair of second oblique sides 18B2 and 18B3 of the second prism 18B. When the incident light incident on the second prism sheet 18 is incident on the second LED-side oblique side 18B2 that is the second oblique side located on the side of the LED 13, the light is not raised when being emitted from the second prism 18B, and tends to be more likely to be emitted as side lobe light. Thus, when the incident light incident on the second prism sheet 18 becomes less likely to be directly incident on the second LED-side oblique side 18B2 that is the second oblique side located on the side of the LED 13, the occurrence of the side lobe light can be suppressed. Most of the incident light incident on the second prism sheet 18 is refracted and emitted by the second opposite-to-LED-side oblique side 18B3 that is the second oblique side located on the side opposite to the LED 13 side, is incident on the third prism sheet 19, and is easily effectively used.

The third prism 19B includes the third base 19B1 parallel to the first direction, and the pair of third oblique sides 19B2 and 19B3 rising from both ends of the third base 19B1, and the pair of third oblique sides 19B2 and 19B3 form the same angle with respect to the third base 19B1. Among the light incident on the third light incident main surface 19A2 of the third prism sheet 19, the light incident on the third opposite-to-LED-side oblique side 19B3 that is the third oblique side located on the side opposite to the LED 13 side in the first direction among the pair of third oblique sides 19B2 and 19B3 of the third prism 19B is refracted and emitted at the third opposite-to-LED-side oblique side 19B3 or is reflected at the third opposite-to-LED-side oblique side 19B3 and directed toward the third LED-side oblique side 19B2 that is the third oblique side located on the side of the LED 13. Here, since the pair of third oblique sides 19B2 and 19B3 form the same angle with respect to the third base 19B1, when the light reflected by the third opposite-to-LED-side oblique side 19B3 that is the third oblique side located on the side opposite to the LED 13 side is incident on the third LED-side oblique side 19B2 that is the third oblique side located on the side of the LED 13, the light is reflected there and easily returns to the second prism sheet 18 side. The light (recursive light) returned to the second prism sheet 18 side reaches the third prism sheet 19 again by being reflected or the like inside the backlight device 12, and is raised and emitted by either of the pair of third oblique sides 19B2 and 19B3 of the third prism 19B. Thus, the usage efficiency of light can be improved.

In addition, a plurality of the first inclined surfaces 22A are disposed side by side along the first direction, and the plurality of first inclined surfaces 22A are configured to increase in area while getting farther from the LED 13. Most of the light reaching the second main surface 15C in the process of propagating inside the light guide plate 15 is reflected by the first inclined surface 22A. Since the plurality of first inclined surfaces 22A arranged along the first direction are configured to increase in area while getting farther from the LED 13, the amount of light reflected by the first inclined surfaces 22A tends to increase while getting farther from the LED 13. Thus, the amount of emission light from the first main surface 15B of the light guide plate 15 is made uniform in the first direction, which is suitable for suppressing luminance unevenness.

Further, the liquid crystal display device (display device) 10 according to the present embodiment includes the backlight device 12 described above, and the liquid crystal panel (display panel) 11 configured to perform display by using light from the backlight device 12. According to the liquid crystal display device 10 having such a configuration, since the emission angle of light can be regulated without using the louver as in the related art, display with excellent display quality can be achieved.

Second Embodiment

A second embodiment will be described with reference to FIG. 10 to FIG. 13. In the second embodiment, a case in which a light reflective sheet 23 is used instead of the light absorption sheet 17. Further, repetitive descriptions of structures, actions, and effects similar to those of the first embodiment described above will be omitted.

Figure 10:
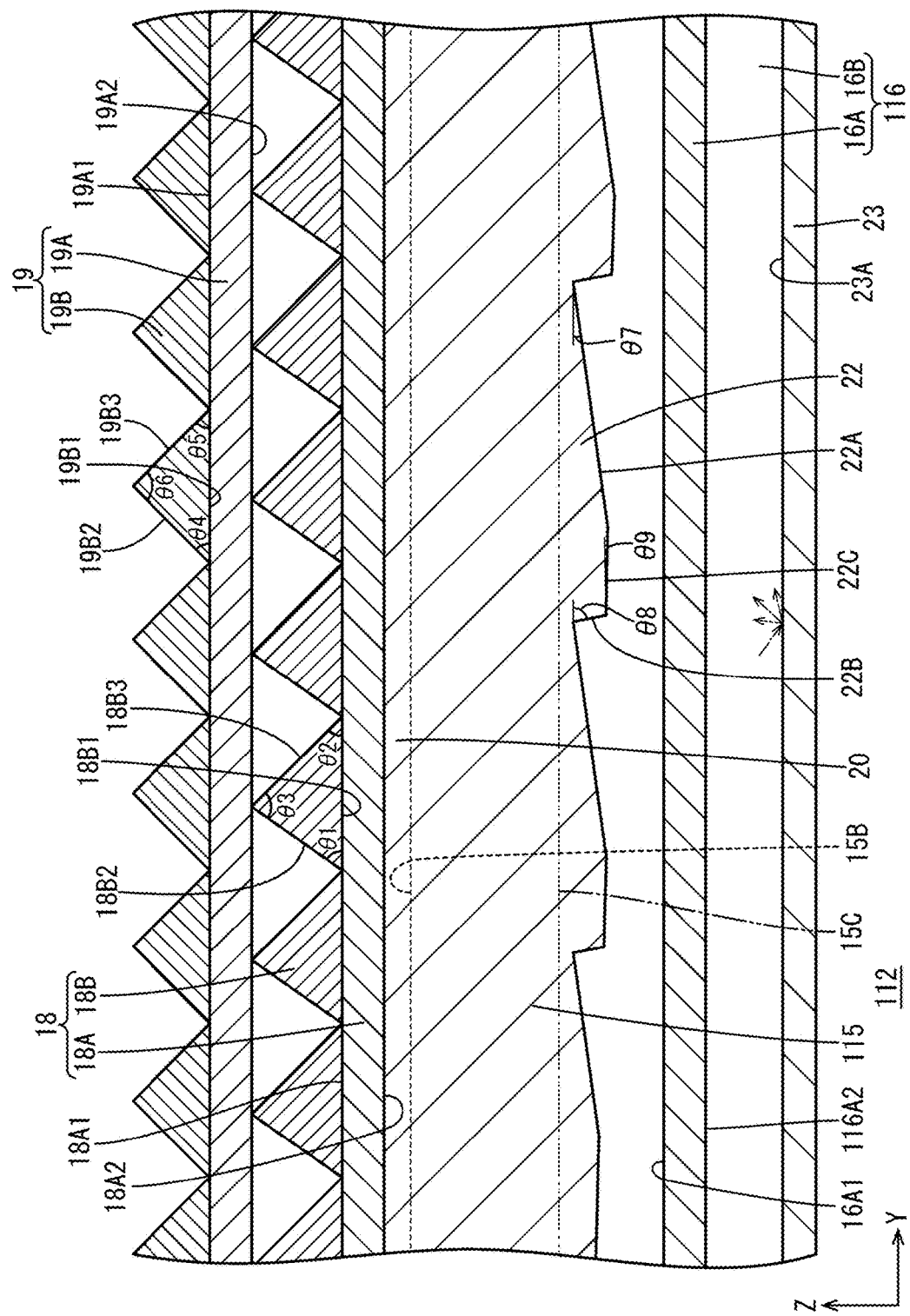
FIG. 10 is a cross-sectional view of a backlight device according to a second embodiment taken along the Y-axis direction.

As illustrated in FIG. 10, a backlight device 112 according to the present embodiment includes the light reflective sheet 23 instead of the light absorption sheet 17 (see FIGS. 2 and 3) described in the first embodiment. The light reflective sheet 23 is disposed overlapping a back side (the side opposite to a light guide plate 115 side) with respect to a first prism sheet 116. The light reflective sheet 23 is disposed such that its main surface is parallel to the main surfaces of the light guide plate 115 and the first prism sheet 116 and covers a fourth main surface 116A2 of the first prism sheet 116. The light reflective sheet 23 is disposed to overlap substantially all over the fourth main surface 116A2 of the first prism sheet 116. The light reflective sheet 23 is made of, for example, PET having a surface exhibiting white, and has light reflectivity higher than that of any of the light guide plate 115 and the first prism sheet 116. Among the pair of main surfaces of the light reflective sheet 23, the main surface on the front side is a light reflective main surface (sixth main surface) 23A that is disposed to face the fourth main surface 116A2 of the first prism sheet 116 and reflects light.

According to such a configuration, the light emitted from the fourth main surface 116A2 of the first prism sheet 116 toward the back side is directed toward the light reflective sheet 23 and is efficiently reflected by the light reflective main surface 23A. The amount of emission light from the fourth main surface 116A2 of the first prism sheet 116 is small, but the luminance pertaining to the emission light from the backlight device 112 can be improved by reflecting the light by the light reflective sheet 23.

Figure 11:
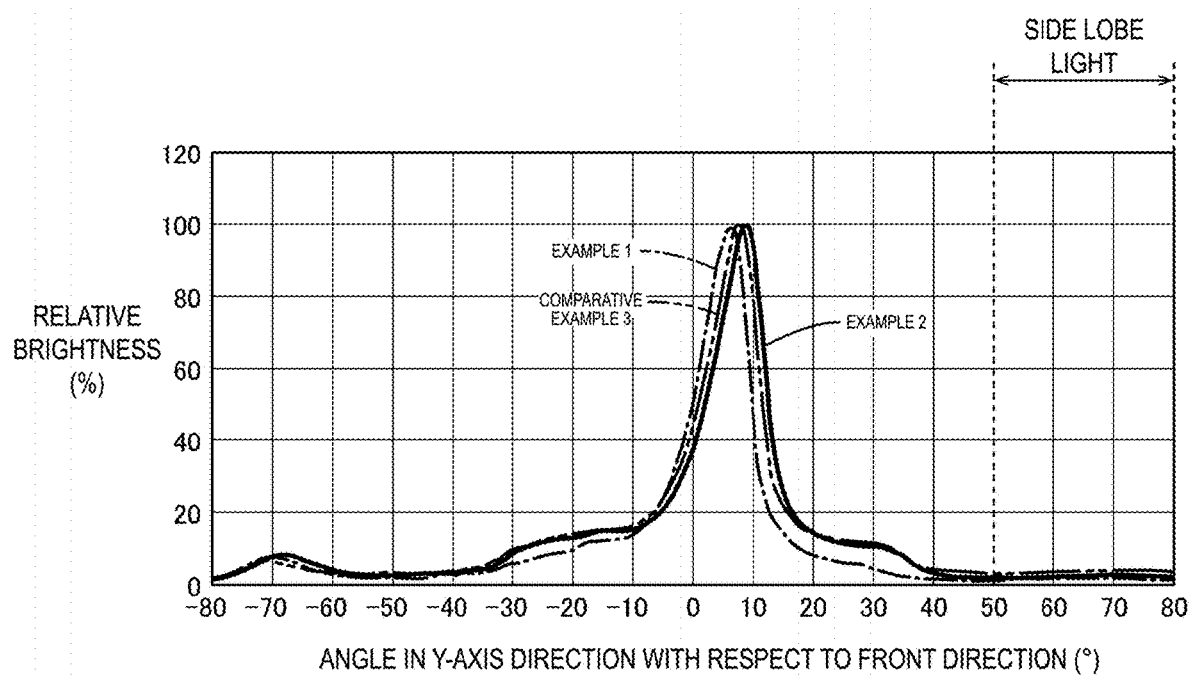
FIG. 11 is a graph showing a light distribution in the Y-axis direction in Comparative Experiment 3 according to the second embodiment.

Next, Comparative Experiments 3 to 5 were performed. First, Comparative Experiment 3 will be described. In Comparative Experiment 3, a light distribution pertaining to the emission light of the backlight device of Example 2 was obtained. In Example 2, the backlight device 112 has the same configuration as that described before the present paragraph. That is, Example 2 is the backlight device of the type A, and is different from Example 1 described in Comparative Experiments 1 and 2 in that the light reflective sheet 23 is included instead of the light absorption sheet 17. Similarly to Comparative Experiment 1, in Comparative Experiment 3, by using the backlight device of Example 2, luminance pertaining to the emission light was measured in a state where the LED was turned on, and graphs pertaining to the light distributions (luminance angle distributions) in the Y-axis direction were produced. Experimental results pertaining to the light distributions in Comparative Experiment 3 are as shown in FIG. 11. The graphs pertaining to the light distributions shown in FIG. 11 are the same as FIG. 8. In FIG. 11, in addition to the graph of Example 2, graphs of Example 1 and Comparative Example 3, which are the experimental results of Comparative Experiment 1, are also shown for reference. In FIG. 11, the graph of Example 2 is shown by a solid line, the graph of Example 1 is shown by a one dot chain line, and the graph of Comparative Example 3 is shown by a two dot chain line.

The experimental results of Comparative Experiment 3 will be described. According to FIG. 11, in the light distribution in Example 2, the peak angle that is the angle at which light exhibits the peak luminance is "+90", and the half width is slightly wider than the half width of the light distribution in Example 1 and equal to the half width of Comparative Example 3. The reason why the half width of the light distribution in Example 2 is slightly wider than the half width of the light distribution in Example 1 is presumed to be that the light is diffused and reflected by the light reflective sheet 23 of Example 2, so that the emission angle range of light is slightly widened. The peak angle of the light distribution in Example 2 is larger than any of the peak angle) (+6° of the light distribution in Example 1 and the peak angle) (+8° of the light distribution in Comparative Example 3. In the light distribution in Example 2, the side lobe light, each of which is light emitted in the range of "+50° to +80°", is suppressed to be sufficiently low to an extent close to the light distribution in Example 1.

Next, a description will be given on Comparative Experiment 4. In Comparative Experiment 4, ratios pertaining to the side lobe light were extracted from the light distribution obtained using the backlight device of Example 2. Similarly to Comparative Experiment 2, in Comparative Experiment 4, by using the backlight device of Example 2, the luminance pertaining to the emission light was measured in a state where the LED was turned on, the light distributions in the Y-axis direction were obtained, and the relative luminance (unit is "%") at each angle of +50°, +60°, +70°, and +80° in the light distributions in the Y-axis direction was extracted. As described in Comparative Experiment 2, in order that the "reflection" is less likely to be visually recognized, the relative luminance at each angle of +50°, +60°, +70°, and +80° is preferably 3% or less.

Experimental results of Comparative Experiment 4 are as shown in a table in FIG. 12. In the table in FIG. 12, in addition to the experimental results of Example 2, the experimental results of Example 1 and Comparative Example 3, which are the experimental results of Comparative Experiment 2, are also shown for reference. Similarly to the table in FIG. 9, the table in FIG. 12 shows information (peak angle, backlight type, presence of the louver, presence of the first prism sheet 16, presence of the light absorption sheet 17, presence of the light reflective sheet 2) regarding the configurations of Examples 1 and 2, and Comparative Example 3, and the relative luminance at each angle of +50°, +60°, +70°, and +80°, which are experimental results.

The experimental results of Comparative Experiment 4 will be described. According to FIG. 12, Example 2 exceeds 3% as the reference value at +60° and +70°, but is suppressed to 3% or less at +50° and +80°. That is, in Example 2, the reflection is easily visually recognized as compared with Example 1 in which the reflectance is 3% or less at all angles, but the reflection is suppressed as compared with Comparative Example 3 in which the reflectance is more than 3% at all angles. The reason why such a result was obtained is presumed to be that since Example 2 is common to Example 1 in that Example 2 is the backlight device of the type A and in that Example 2 includes the first prism sheet 116, even when the light is diffused and reflected by the light reflective sheet 23, the emission angle range of light can be regulated to a certain extent. As described above, according to Example 2, the cost can be reduced without using the louver, and the reflection caused by the side lobe light can be suppressed to a certain extent while obtaining the luminance improving effect by the light reflective sheet 23.

Figure 13:
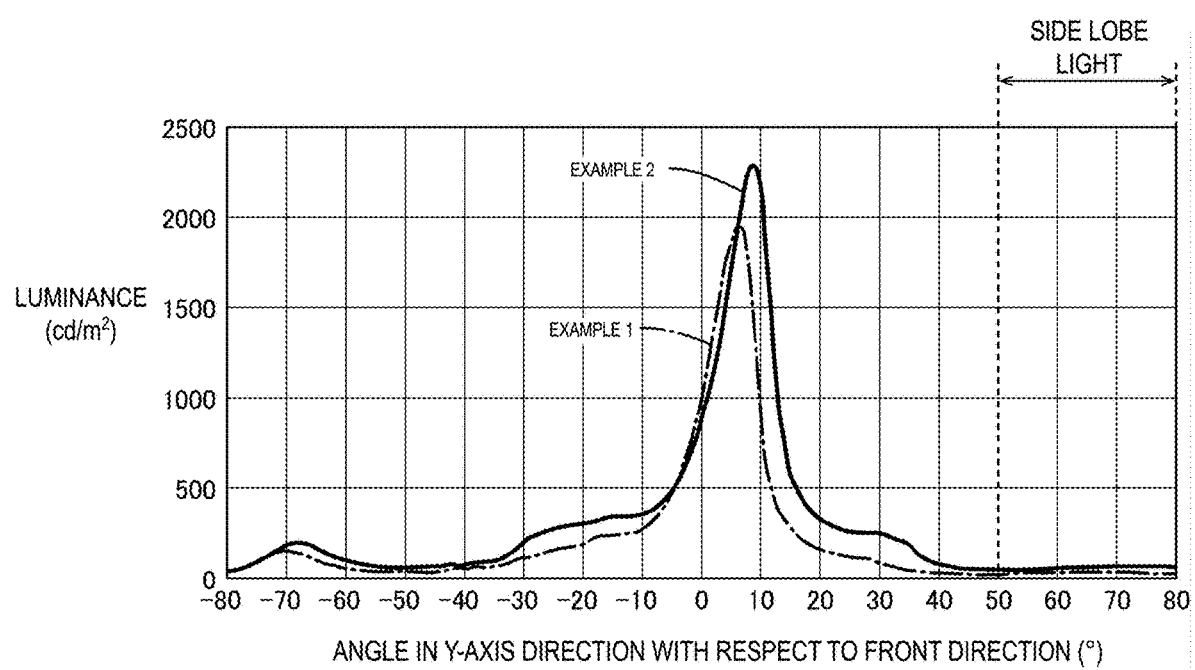
FIG. 13 is a graph showing a light distribution in the Y-axis direction in Comparative Experiment 5 according to the second embodiment.

Next, a description will be given on Comparative Experiment 5. In Comparative Experiment 5, the light distributions pertaining to the emission light of the backlight devices of Examples 1 and 2 were obtained in the same manner as in Comparative Experiment 3 described above, and the vertical axis in the graphs of the light distributions was set to "luminance" of an absolute value. Similarly to Comparative Experiment 1, in Comparative Experiment 5, by using the backlight devices of Examples 1 and 2, luminance pertaining to the emission light was measured in a state where the LED was turned on, and graphs pertaining to the light distributions in the Y-axis direction were produced. Experimental results pertaining to the light distributions in Comparative Experiment 5 are as shown in FIG. 13. In the graphs according to the light distributions shown in FIG. 13, a horizontal axis is an angle (in units of "°") in the Y-axis direction with respect to the front direction (Z-axis direction), and a vertical axis is luminance (in units of "cd/m$^2$"). In FIG. 13, the graph of Example 2 is shown by a solid line, and the graph of Example 1 is shown by a one dot chain line.

The experimental results of Comparative Experiment 5 will be described. According to FIG. 13, the peak luminance pertaining to the light distribution in Example 1 is slightly lower than 2000 cd/m2, whereas the peak luminance pertaining to the light distribution in Example 2 is about 2300 cd/m2. That is, the peak luminance pertaining to the light distribution in Example 2 is higher than the peak luminance pertaining to the light distribution in Example 1. The reason for this is presumed to be that, in Example 1, the light emitted from the first prism sheet 16 to the back side is absorbed by the light absorption sheet 17 and is not used as the emission light, whereas, in Example 2, the light emitted from the first prism sheet 16 to the back side is reflected by the light reflective sheet 23 and is used as the emission light. As described above, according to Example 2, the effect of improving the peak luminance pertaining to the emission light can be obtained.

As described above, according to the present embodiment, the light reflective sheet 23 including one main surface serving as the light reflective main surface (sixth main surface) 23A disposed to face the fourth main surface 116A2 and having light reflectivity higher than any of the light guide plate 115 and the first prism sheet 116. The light emitted from the fourth main surface 116A2 of the first prism sheet 116 is directed toward the light reflective sheet 23. The light reflective sheet 23 has the light reflectivity higher than any of the light guide plate 115 and the first prism sheet 116, so that the light reflective sheet 23 can efficiently reflect the light emitted from the fourth main surface 116A2 by the light reflective main surface 23A. The amount of emission light from the fourth main surface 116A2 of the first prism sheet 116 is small, but the luminance pertaining to the emission light from the backlight device 112 can be improved by reflecting the light by the light reflective sheet 23.

Third Embodiment

A third embodiment will be described with reference to FIG. 14 to FIG. 16. In the third embodiment, a case in which a configuration of a light guide plate 215 is changed will be described. Further, repetitive descriptions of structures, actions, and effects similar to those of the first embodiment described above will be omitted.

Figure 14:
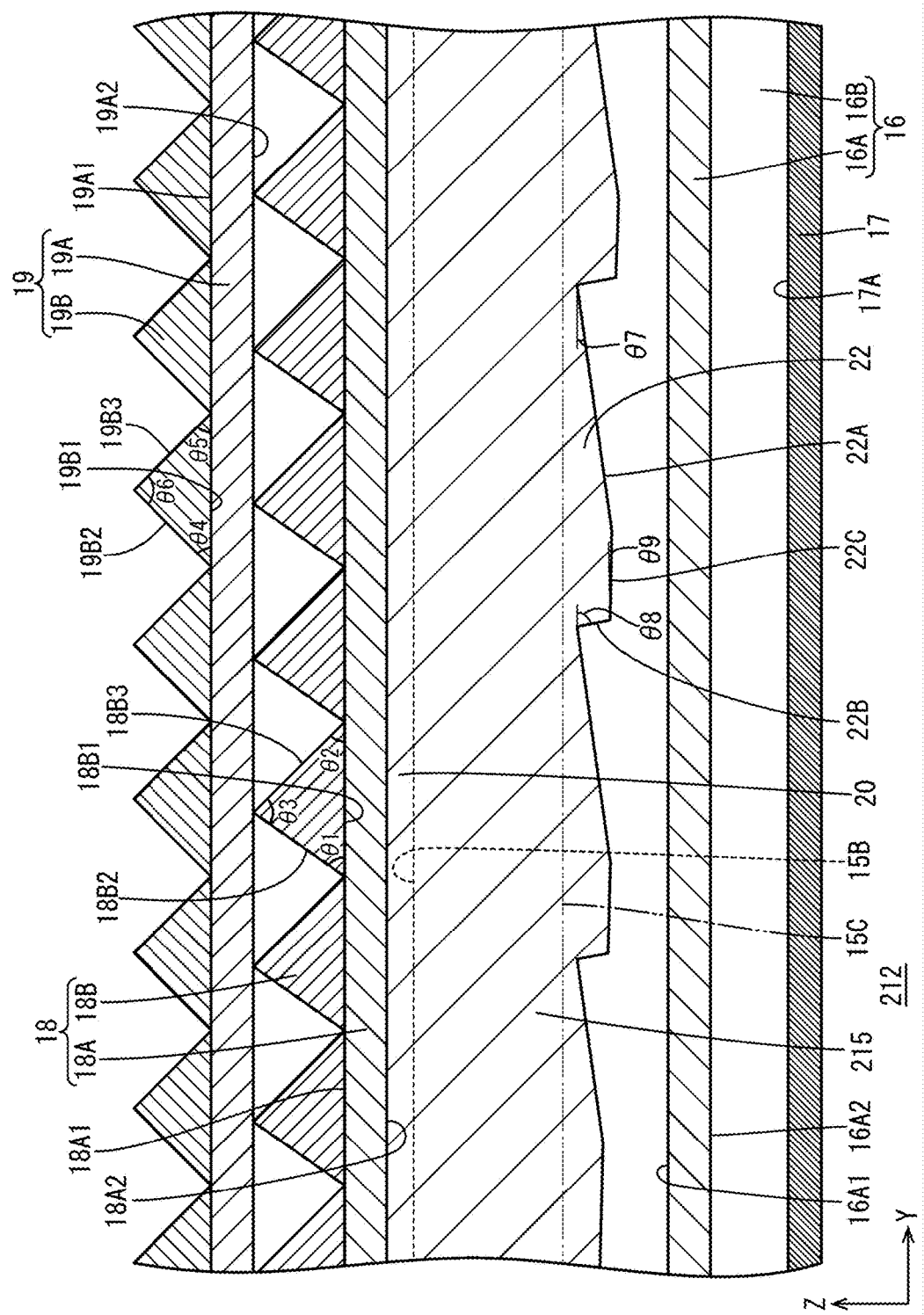
FIG. 14 is a cross-sectional view of a backlight device according to a third embodiment taken along the Y-axis direction.
Figure 15:
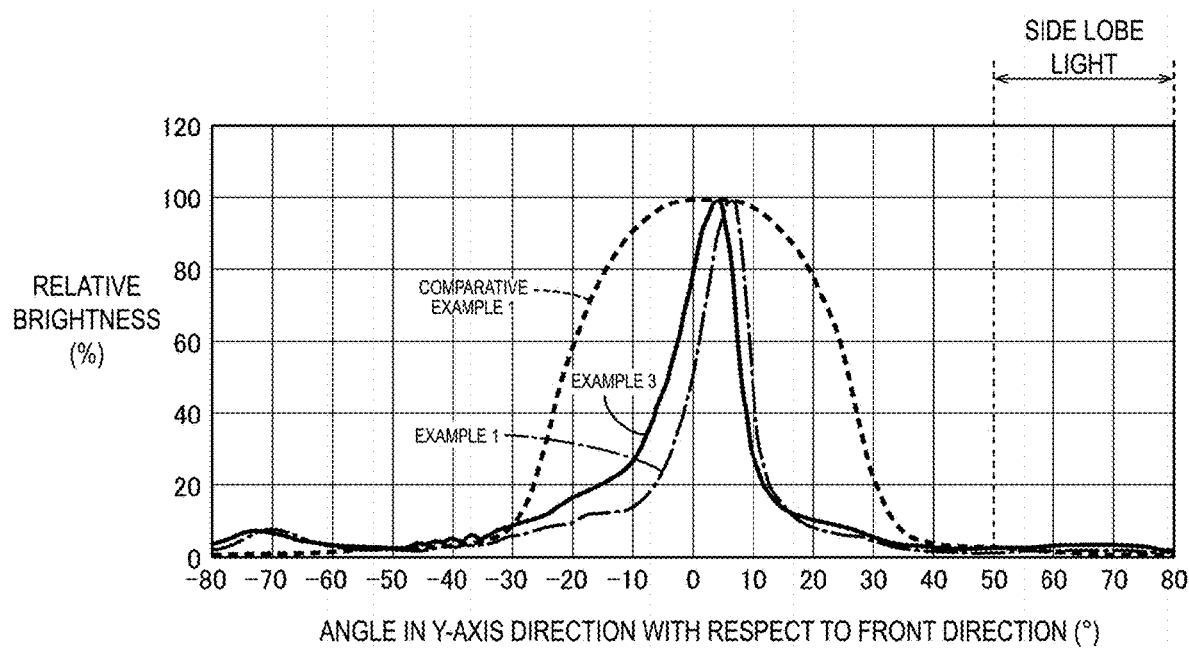
FIG. 15 is a graph showing a light distribution in the Y-axis direction in Comparative Experiment 6 according to the third embodiment.

As illustrated in FIG. 14, in the backlight device 212 according to the present embodiment, a material and a refractive index of the light guide plate 215 are changed from those of the first embodiment. The light guide plate 215 according to the present embodiment is made of a material having a refractive index higher than the light guide plate 15 (see FIGS. 2 and 3) described in the first embodiment. Specifically, in the present embodiment, the light guide plate 215 is made of, for example, polycarbonate (PC) as the synthetic resin material, and has the refractive index of, for example, about 1.52. In this way, the angle imparted when light is incident on the light guide plate 215 or when light is emitted from the light guide plate 215 is different from the angle imparted in the first embodiment. The critical angle in the light guide plate 215 is also different from the critical angle in the first embodiment. Accordingly, in the present embodiment, the angle (peak angle) at which light exhibits the peak luminance in the light distribution pertaining to the emission light in the backlight device 212 is "+4°".

Next, Comparative Experiments 6 and 7 similar to Comparative Experiments 1 and 2 described in the first embodiment were performed. In Comparative Experiment 6, a light distribution pertaining to the emission light of the backlight device of following Example 3 was obtained. In Example 3, the backlight device 212 has the same configuration as that described before the present paragraph. That is, Example 3 is the backlight device of the type A, and the material and the refractive index of the light guide plate 215 are different from those of Example 1 described in Comparative Experiment 1.

Similarly to Comparative Experiment 1, in Comparative Experiment 6, by using the backlight device of Example 3, luminance pertaining to the emission light was measured in a state where the LED was turned on, and graphs pertaining to the light distributions (luminance angle distributions) in the Y-axis direction were produced. Experimental results pertaining to the light distributions in Comparative Experiment 6 are as shown in FIG. 15. The graphs pertaining to the light distributions shown in FIG. 15 are the same as FIG. 8. In FIG. 15, in addition to the graph of Example 3, graphs of Example 1 and Comparative Example 1, which are the experimental results of Comparative Experiment 1, are also shown for reference. In FIG. 15, the graph of Example 3 is shown by a solid line, the graph of Example 1 is shown by a one dot chain line, and the graph of Comparative Example 1 is shown by a broken line.

The experimental results of Comparative Experiment 6 will be described. According to FIG. 15, in the light distribution in Example 3, the peak angle that is the angle at which light exhibits the peak luminance is "+4°", and a half width is slightly wider than a half width of the light distribution in Example 1. The reason why the half width of the light distribution in Example 3 is slightly wider than the half width of the light distribution in Example 1 is presumed to be that the refractive index of the light guide plate 215 of Example 3 is made higher than the refractive index of the light guide plate 15 of Example 1, so that the emission angle range of light is slightly widened. The peak angle of the light distribution in Example 3 is larger than the peak angle (+3°) of the light distribution in Comparative Example 1, but smaller than the peak angle) (+6° of the light distribution in Example 1. In the light distribution in Example 3, the side lobe light, each of which is light emitted in the range of "+50° to +80°", is suppressed to be sufficiently low to an extent close to the light distribution in Example 1.

Next, a description will be given on Comparative Experiment 7. In Comparative Experiment 7, ratios pertaining to the side lobe light were extracted from the light distribution obtained using the backlight device of Example 3 described in Comparative Experiment 6. Similarly to Comparative Experiments 2 and 4, in Comparative Experiment 7, by using the backlight device of Example 3, the luminance pertaining to the emission light was measured in a state where the LED was turned on, the light distribution in the Y-axis direction was obtained, and the relative luminance (unit is "%") at each angle of +50°, +60°, +70°, and +80° in the light distributions in the Y-axis direction was extracted. As described in Comparative Experiment 2, in order that the "reflection" is less likely to be visually recognized, the relative luminance at each angle of +50°, +60°, +70°, and +80° is preferably 3% or less.

Experimental results of Comparative Experiment 7 are as shown in a table in FIG. 16. In the table in FIG. 16, in addition to the experimental results of Example 5, the experimental results of Examples 1 and 2 and Comparative Example 1, which are the experimental results of Comparative Experiments 2 and 4, are also shown for reference. Similarly to the table in FIG. 9, the table in FIG. 16 shows information (peak angle, backlight type, presence of the louver, presence of the first prism sheet 16, presence of the light absorption sheet 17, presence of the light reflective sheet 2) regarding the configurations of Examples 1 to 3 and Comparative Examples 1 and the relative luminance at each angle of +50°, +60°, +70°, and +80°, which are experimental results.

The experimental results of Comparative Experiment 7 will be described. According to FIG. 16, in Example 3, the relative luminance is suppressed to 3% or less at any angle of +50°, +60°, +70°, and +80°. Specifically, in Example 3, the amount of side lobe light is slightly larger than in Example 1 at all angles, but the side lobe light is suppressed more than in Example 2. The peak angle of the light distribution in Example 3 has a value closer to the peak angle of the light distribution in Comparative Example 1 than in Examples 1 and 2. As described above, in Example 3, the peak angle of the light distribution is close to that of Comparative Example 1, and the side lobe light is suppressed to an extent close to that of Example 1.

Other Embodiments

The techniques disclosed herein are not limited to the embodiments described above and illustrated in the drawings, and the following embodiments, for example, are also included within the technical scope.

(1) In the third embodiment, the case is described in which the material and the refractive index of the light guide plate 215 are changed from those of the first embodiment. Alternatively, for example, the material and the refractive index of the second prism sheet 18 may be changed from those of the first embodiment, or the inclination angles θ1 and θ2 formed by the second oblique sides 18B2 and 18B3, respectively, with respect to the second base 18B1 and the angle θ3 formed by the pair of second oblique sides 18B2 and 18B3 may be changed from those of the first embodiment, so that the peak angle pertaining to the light distribution of the emission light can be adjusted. Note that, in the configuration described in each embodiment, a specific numerical value of the peak angle (θvp) pertaining to the light distribution of the emission light can be appropriately changed other than the above.

(2) In the first prism sheets 16 and 116, specific numerical values of the inclination angles θ10 and θ11 formed by the first oblique sides 16B2 and 16B3, respectively, with respect to the first base 16B1 and the angle θ12 formed by the pair of first oblique sides 16B2 and 16B3 can be changed as appropriate.

(3) In the second prism sheet 18, specific numerical values of the inclination angles θ1 and θ2 formed by the second oblique sides 18B2 and 18B3, respectively, with respect to the second base 18B1 and the angle θ3 formed by the pair of second oblique sides 18B2 and 18B3 can be changed as appropriate.

(4) In the third prism sheet 19, specific numerical values of the inclination angles θ4 and θ5 formed by the third oblique sides 19B2 and 19B3, respectively, with respect to the third base 19B1 and the angle θ6 formed by the pair of third oblique sides 19B2 and 19B3 can be changed as appropriate.

(5) Numerical values of the inclination angles θ7 to θ9 formed by the first inclined surface 22A, the second inclined surface 22B, and the third inclined surface 22C, respectively, included in the third light guide plate lens 22 with respect to the Y-axis direction can be changed as appropriate.

(6) In the configurations described in the first and third embodiments, the light absorption sheet 17 may exhibit a color (for example, gray) other than black.

(7) In the configuration described in the second embodiment, the light reflective sheet 23 may exhibit a color (for example, silver) other than white.

(8) Numerical values of installation numbers of the LEDs 13 and 113, an arrangement interval of the first light guide plate lenses 20, a contact angle of the first light guide plate lens 20, and an apex angle of the second light guide plate lens 21 can be changed as appropriate.

(9) The material and the refractive index of each of the first prism sheets 16 and 116, the second prism sheet 18, and the third prism sheet 19 can be appropriately changed other than the above.

(10) The material and the refractive index of each of the light guide plates 15, 115, and 215 can be appropriately changed other than the above.

(11) The specific cross-sectional shape of the first light guide plate lens 20 can be changed as appropriate. For example, the cross-sectional shape of the first light guide plate lens 20 may be a triangular shape.

(12) The specific cross-sectional shape of the second light guide plate lens 21 can be changed as appropriate. For example, the cross-sectional shape of the second light guide plate lens 21 may be a semi-circular shape (cylindrical lens) or the like.

(13) The specific cross-sectional shape of the third light guide plate lens 22 can be changed as appropriate.

(14) In addition to a configuration in which each of the thicknesses of the light guide plates 15, 115, and 215 is constant throughout its entire length, the configuration may be such that the thickness decreases while getting farther from the LED 13, and the opposite main surface is inclined.

(15) The planar shape of each of the light guide plates 15, 115, and 215 may be a trapezoidal shape, inverted trapezoidal shape, arch shape, semi-circular shape, semi-elliptical shape, trapezoidal shape with an arc-shaped upper base, or the like in addition to a rectangular shape. Along with the change of the planar shape of each of the light guide plates 15, 115, and 215, the planar shape of each of the backlight devices 12, 112, and 212 and the liquid crystal display device 10 can also be changed.

(16) The LED 13 may be a top light emitting type in addition to the side light emitting type.

(17) A light source such as an organic electro luminescence (EL) may be used instead of the LED 13.

(18) A reflective polarizing sheet instead of a polarizer may be attached to the main surface on the back side (outer side) of the array substrate constituting the liquid crystal panel 11. The reflective polarizing sheet includes a polarization layer having a specific polarization axis (transmission axis), a multilayer film in which layers having mutually different refractive indices are alternately layered, a protection layer, and the like. The polarization layer has a polarization axis and an absorption axis orthogonal to the polarization axis, so that linearly polarized light parallel to the polarization axis can be selectively transmitted and circularly polarized light can be converted to linearly polarized light along the polarization axis. The polarization axis of the polarization layer has an orthogonal relationship to the polarization axis of the polarizer attached to the main surface at the outer side of the CF substrate. The multilayer film has a multilayer structure, and has a reflection characteristic that the reflectivity for the s-waves included in light is generally higher than the reflectivity for the p-waves. The reflective polarizing sheet being provided with the multilayer film can reflect s-waves that are originally to be absorbed by the polarization layer toward the back side to allow the s-waves to be reused, thereby enhancing the usage efficiency (and then, luminance) of light.

(19) The liquid crystal display device 10 for vehicle application may be installed at a position other than the front of the driver's seat of a passenger car. For example, the liquid crystal display device 10 may be installed at a position of the front of the front passenger seat or at a position between the front passenger seat and the driver's seat.

(20) The liquid crystal display device 10 may be used for applications other than the vehicle application.

(21) The illumination device may be used in a display device of a type other than the liquid crystal display device 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An illumination device comprising:
a light source;
a light guide plate including:
  a first end face that includes at least some of outer peripheral end faces of the light guide plate and that faces the light source and on which light is incident,
  a first main surface that is one main surface of the light guide plate, and
  a second main surface that is another main surface of the light guide plate; and
a first prism sheet including:
  a third main surface that is one main surface of the first prism sheet and that is disposed to face the second main surface, and
  a fourth main surface that is another main surface of the first prism sheet,
wherein the second main surface of the light guide plate is provided with an inclined surface that has an inclination rising from a side opposite a light source side toward the light source side in a first direction including a direction from the light source toward the light guide plate,
the fourth main surface of the first prism sheet is provided with a plurality of first prisms extending along the first direction and is arranged along a second direction intersecting the first direction and along the fourth main surface, and
each of the plurality of first prisms includes a first base parallel to the second direction and a pair of first oblique sides rising from both ends of the first base.

2. The illumination device according to claim 1, further comprising:
a light absorption sheet including a fifth main surface that is one main surface of the light absorption sheet and that is disposed to face the fourth main surface, and having a light absorbability higher than any of the light guide plate and the first prism sheet.

3. The illumination device according to claim 1, further comprising:
a light reflective sheet including a sixth main surface that is one main surface of the light reflective sheet and that is disposed to face the fourth main surface, and having a light reflectivity higher than any of the light guide plate and the first prism sheet.

4. The illumination device according to claim 1, further comprising:
a second prism sheet including:
  a seventh main surface that is one main surface of the second prism sheet, and
  an eighth main surface that is another main surface of the second prism sheet and that is disposed to face the first main surface; and
a third prism sheet including:
  a ninth main surface that is one main surface of the third prism sheet, and
  a tenth main surface that is another main surface of the third prism sheet and that is disposed to face the seventh main surface,
wherein the seventh main surface of the second prism sheet is provided with a plurality of second prisms extending along the second direction and is disposed side by side along the first direction, and
the ninth main surface of the third prism sheet is provided with a plurality of third prisms extending along the second direction and is disposed side by side along the first direction.

5. The illumination device according to claim 4,
wherein each of the plurality of second prisms includes a second base parallel to the first direction and a pair of second oblique sides rising from both ends of the second base, and
among the pair of second oblique sides, a second oblique side on the light source side in the first direction forms a larger angle with respect to the second base than another second oblique side opposite the light source side in the first direction.

6. The illumination device according to claim 4,
wherein each of the plurality of third prisms includes a third base parallel to the first direction and a pair of third oblique sides rising from both ends of the third base, and
angles between each of the pair of third oblique sides and the third base are equal.

7. The illumination device according to claim 1,
wherein the inclined surface includes a plurality of first inclined surfaces,
the plurality of first inclined surfaces is disposed side by side along the first direction, and
the plurality of first inclined surfaces increases in area while getting farther from the light source.

8. A display device comprising:
the illumination device according to claim 1; and
a display panel configured to display by using light from the illumination device.

* * * * *